United States Patent [19]
Uno

[11] Patent Number: 6,061,524
[45] Date of Patent: May 9, 2000

[54] CAMERA

[75] Inventor: Tetsuya Uno, Sakai, Japan

[73] Assignee: Minolta Co., Ltd., Osaka, Japan

[21] Appl. No.: 09/168,278

[22] Filed: Oct. 8, 1998

[30] Foreign Application Priority Data

Oct. 9, 1997 [JP] Japan ................................. 9-277554

[51] Int. Cl.⁷ ............................. G03B 1/00; G03B 13/34; G03B 17/00
[52] U.S. Cl. ............................ 396/83; 396/85; 396/132; 396/413; 396/418
[58] Field of Search .................... 396/83, 85, 87, 396/132, 418, 413, 405

[56] References Cited

U.S. PATENT DOCUMENTS

| | | | |
|---|---|---|---|
| 4,619,510 | 10/1986 | Nakanishi | 396/405 X |
| 5,274,410 | 12/1993 | Kuwada et al. | 396/448 |
| 5,697,263 | 12/1997 | Funahashi et al. | 396/387 X |

FOREIGN PATENT DOCUMENTS 08094907  12/1996  Japan .

*Primary Examiner*—W. B. Perkey
*Attorney, Agent, or Firm*—McDermott, Will & Emery

[57] ABSTRACT

In a zooming-focusing type camera, a driving force of a motor is selectively transmitted to a zooming mechanism for controlling a focal length of an optical lens system, a film winding mechanism for winding a film by a length corresponding to one frame and a film rewinding mechanism for rewinding the film into a film cartridge by a switching mechanism. The switching mechanism has a planet gear revolving among and selectively engages with one of a winding gear of the film winding mechanism, a rewinding gear of the film rewinding mechanism and an input gear of the zooming mechanism for transmitting the driving force of the motor.

16 Claims, 21 Drawing Sheets

CAMERA

This application is based on patent application No. 9-277554 filed in Japan, the content of which are hereby incorporated by references.

BACKGROUND OF THE INVENTION

1. Field of the Invention

This invention relates to a camera in which focusing and focal length control of a zoom lens and winding and rewinding of a film are driven by driving force of the same motor.

2. Description of the Prior Art

In a first conventional camera which is called zooming-focusing type camera, positions of a plurality (for example, two) of lens groups constituting a zoom lens are controlled by a multistage cam for controlling focal length and focusing of the zoom lens, continuously. The focal length control and the focusing of the zoom lens can be controlled by the same motor. Film winding and rewinding are controlled by another motor. Since the first conventional camera needs two motors for the operations of the focal length control and the focusing of the zoom lens and the winding and rewinding of the film, it is difficult not only to downsize the camera and but also to reduce the cost.

In a second conventional camera, a position of a planet gear is controlled by a plunger for selectively transmitting driving force of a motor to one of a focal length control mechanism and a film winding and rewinding mechanism. The focusing of the zoom lens of the second conventional camera is controlled by another motor. Since the second conventional camera uses the plunger for changing the position of the planet gear, the sounds of the motor and the plunger are alternately heard. Thus, it is noisy when the motion of the camera is changed. Furthermore, the second conventional camera needs two motors and a plunger for driving a focal length control and a focusing mechanisms for the zoom lens, a winding and a rewinding mechanisms for the film. Thus, it is difficult not only to downsize and but also to reduce the cost of the camera.

SUMMARY OF THE INVENTION

An object of this invention is to provide a camera in which at least three motions of the focal length control of the zoom lens and the winding and rewinding of the film, more preferably four motions adding the focusing of the zoom lens can be driven by the same motor so as to reduce the noisy sound.

A camera in accordance with this invention comprises a driving source, a zooming mechanism which includes a moving member for varying a focal length of an optical lens system, a driven mechanism, and a switching mechanism which selectively transmits a driving force of the driving source to one of the zooming mechanism and the driven mechanism corresponding to the position of the moving member.

DETAILED DESCRIPTION OF THE PREFERRED EMBODIMENTS OF THE INVENTION

Figure 1:
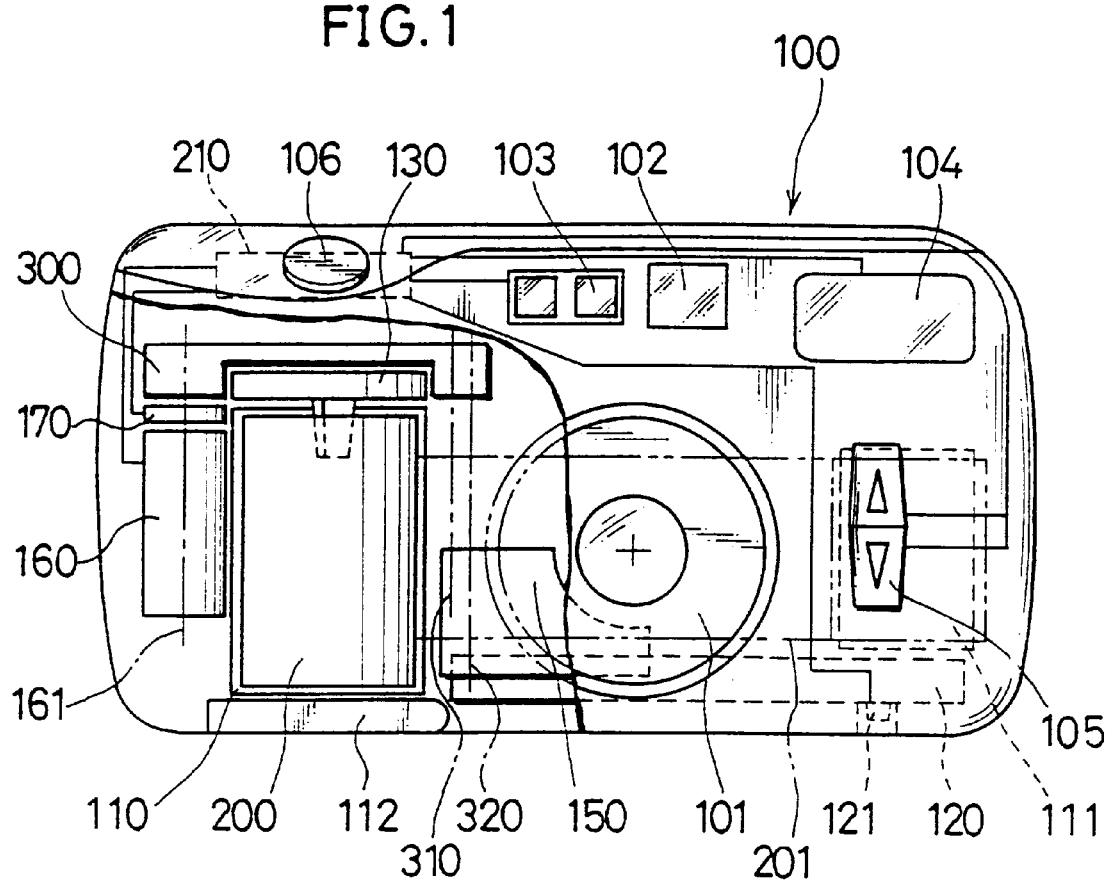
FIG. 1 is a partially cross-sectional front view showing a configuration of a camera in accordance with an embodiment this invention.

An embodiment of a camera of this invention is described with reference to the figures. FIG. 1 shows a partially cross-sectional front view of a camera 100 in accordance with an embodiment of this invention. A zooming-focusing type lens unit 101 configured by a plurality of lens groups is provided in a center portion of the camera 100. A viewfinder 102 and a focusing sensor 103 are provided substantially just above the lens unit 101. A flash unit 104 is provided at a portion upper right of the lens unit 101. A zooming switch 105 for controlling a focal length of the optical lens system of the lens unit 101 to a telescopic end or to a wide view end is provided at a position right hand of the lens unit 101. A shutter release button 106 is provided at a left side on a top cover of the camera 100.

Since the camera 100 is called lens shutter type camera, a shutter unit serving as an aperture is provided in the optical lens system of the lens unit 101. The focusing sensor 103, which is called active type, emits a light having a predetermined wavelength to an object and detests a reflected light from the object by a principle of triangulation. Thus, an absolute distance to the object from the camera can be measured.

A film cartridge chamber 110 to which a film cartridge 200 is mounted is provided at left hand of the lens unit 101 inside the camera 100. A spool to which a film is wound is provided at right hand of the lens unit 101 inside the camera 100. A lid 112 for closing an opening of the film cartridge chamber 110 through which the film cartridge 200 is mounted is provided on the bottom of the film cartridge chamber 110. A film winding mechanism 120 for rotating the spool 111 in a predetermined direction so as to wind a film 201 around the spool 111 is provided below the lens unit 101 and the spool 111. Furthermore, a film rewind switch 121 for rewinding the film 201 in the film cartridge 200 forcibly is provided on a bottom cover of the camera 100. Generally, the film rewind switch 121 is rarely used, so that it is necessary to protect the film rewind switch 121 so as not to be turned on by a careless operation. Thus, a portion of the bottom cover of the camera 100 on which the film rewind switch 121 is provided is hollowed from the other portion. In order to turn on the film rewind switch 121, it should be pushed by a peaked member such as a tip of a ball pencil.

A film rewinding mechanism 130 is provided above the film cartridge chamber 110. The film rewinding mechanism 130 includes a fork or a key which can be engaged with an inner spool (not shown) in the film cartridge 200. The film rewinding mechanism rotates the fork or key for rewinding the film 201 around the inner spool in the film cartridge 200.

A switching mechanism 300 is provided above the film rewinding mechanism 130. The switching mechanism 300 selectively transmits a driving force of a motor 160 to one of the film winding mechanism 120, the film rewinding mechanism 130 and a zooming mechanism 150 (which will be described below).

An encoder 170 is provided in the vicinity of the motor 160. The encoder 170 detects rotation number of times (or rotation angle) and rotation direction of the rotation shaft 161 of the motor 160

The zooming mechanism 150 is provided in the vicinity of the lens unit 101 inside the camera 100. The zooming mechanism 150 controls not only a focal length of the optical lens system but also focuses the optical lens system of the lens unit 101. Output shafts 310 and 320 of the switching mechanism 300 are respectively oriented in a direction perpendicular to an optical axis of the optical lens system of the lens unit 101 and respectively engaged with the zooming mechanism 150 and the film rewinding mechanism 130.

Figure 2:
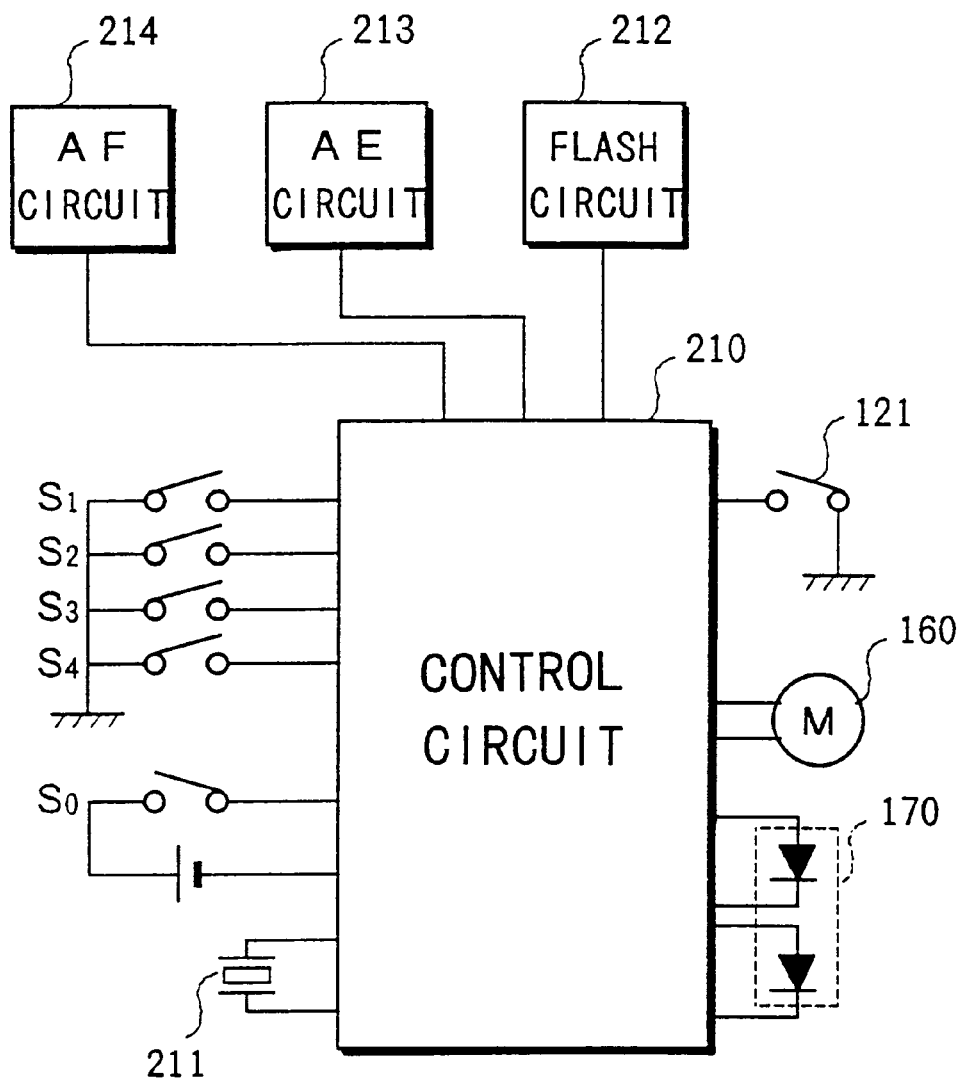
FIG. 2 is a block diagram showing a connection of a control circuit of the camera in accordance with the embodiment.

A control portion of the camera 100 is shown in FIG. 2. The motor 160, the encoder 170 and the film rewind switch 121 are connected to a control circuit 210. Furthermore, a quartz 211 for generates a predetermined driving crock, a flash circuit 212 for controlling the flash unit 104, an AE circuit 213 for detecting a luminance of an object and controlling an aperture value and an exposure time, and an AF circuit 214 for operating a distance to the object based on an output signal from the focusing sensor 103 are connected to the control circuit 210. Still furthermore, a main switch S0 of the camera 100, a shutter release switch S1 which is turned on by pushing down the shutter release button 106 thereby starting exposure on the film 201, a cam position switch S2 provided in the switching mechanism 300 and outputting a predetermined signal corresponding to a position of the zooming mechanism 150, a wide view switch S3 in the zooming switch 105 for controlling the focal length of the optical lens system of the lens unit 101 from the telescopic side to the wide view side, and a telescopic switch S4 in the zooming switch 105 for controlling the focal length of the optical lens system from the wide view side to the telescopic side are connected to the control circuit 210.

A zooming-focusing operation of the zooming mechanism 150 for controlling both of the focal length and the focus of the optical lens system of the lens unit 101 is described. A zoom lens having an optical lens system constituted by two lens groups and a known zooming focusing mechanism is used as an example of the optical lens system of the lens unit 101.

Generally, a focal length of an optical lens system of a zoom lens (which is not the zooming-focusing type one) can continuously be varied between the shortest focal length at the wide view end and the longest focal length at the telescopic end. On the other hand, in the zooming-focusing type zoom lens, a focal length of an optical lens system can be selected among a plurality of predetermined focal lengths, for example, M1, M2 and M3 which are previously set between the shortest focal length W at the wide view end and the longest focal length T at the telescopic end. A position of a part of lens groups, for example, a rear lens group is moved for focusing the optical lens system in a region where the focal length of the optical lens system is not controlled. Thus, both of the control of the focal length and the focusing of the optical lens system can be executed by moving only zooming cams of the zooming-focusing mechanism.

Figure 3:
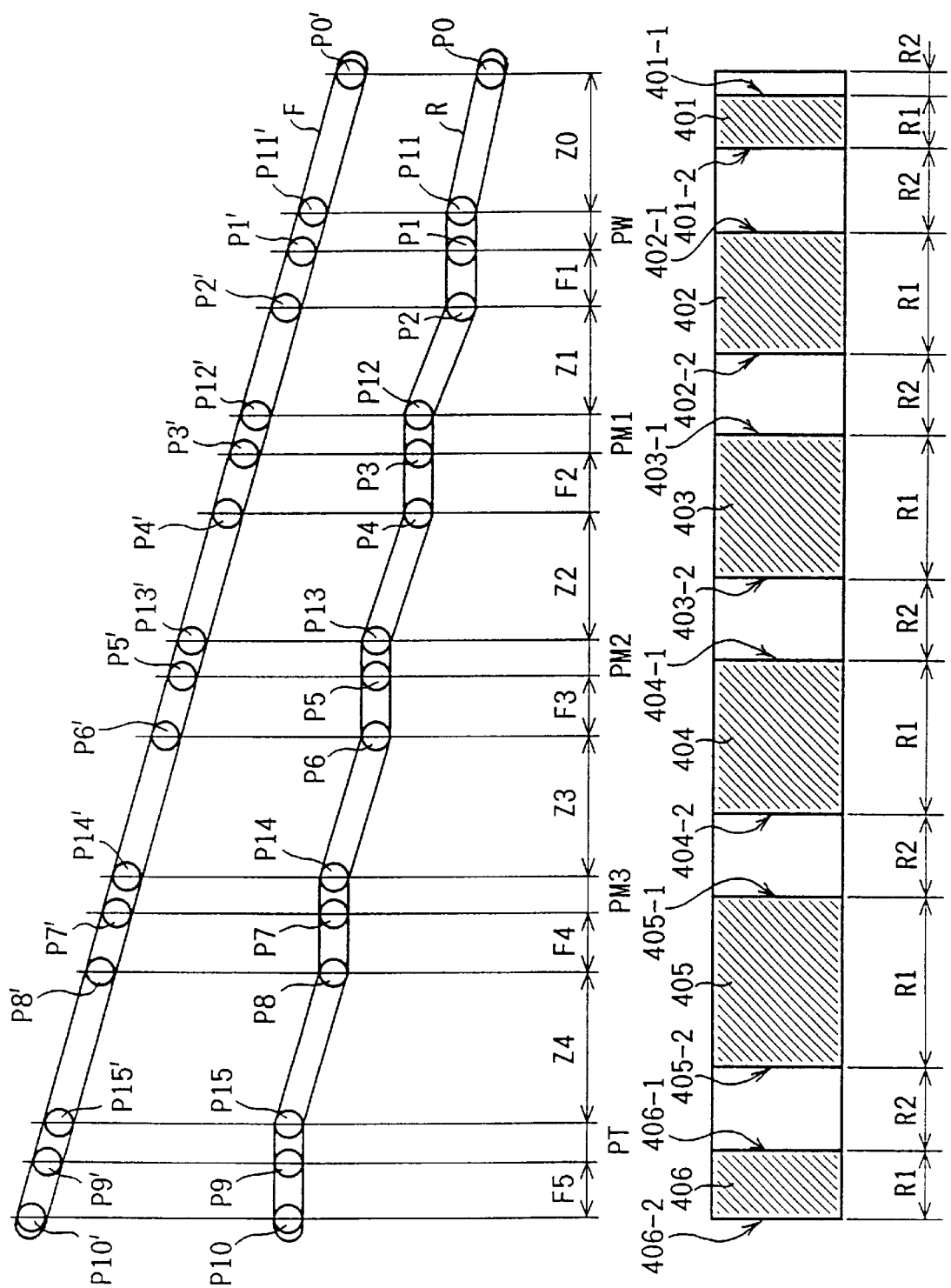
FIG. 3A is a chart showing shapes of cam grooves and positions of guide pins of a front and a rear lens groups in a zooming-focusing operation in the embodiment.
FIG. 3B is a chart showing a linear development of an annular patterns formed on a cam disc of a switching mechanism in the embodiment.
Figure 4:
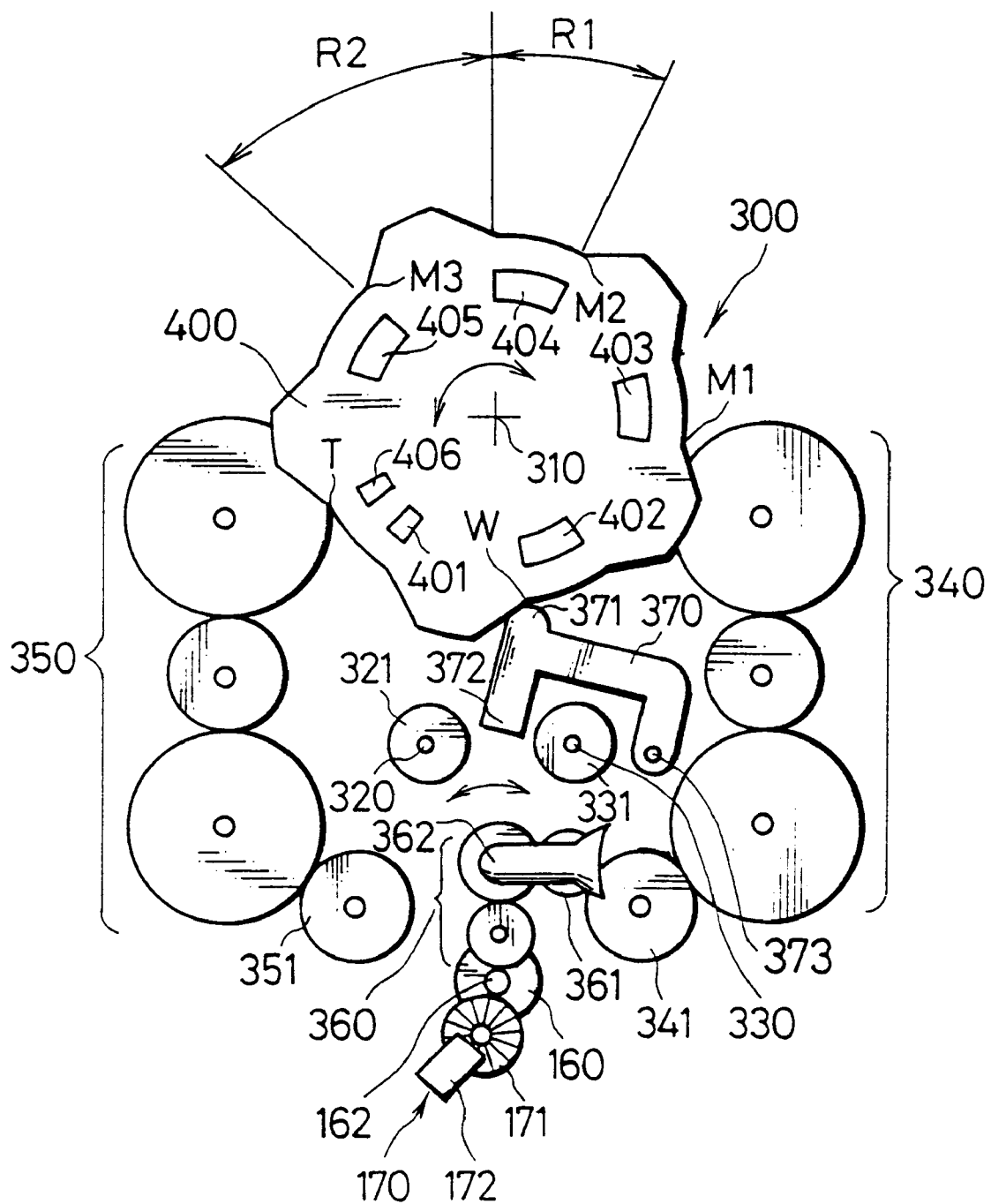
FIG. 4 is a plan view showing a configuration of the switching mechanism in the embodiment.

Shapes of cam grooves and positions of guide pins provided on lens barrels of the front and rear lens groups in the zooming-focusing operation are shown in FIG. 3A. In FIG. 3A, a front cam groove F is used for controlling a position of a front lens group of an optical lens group of the lens unit 101, and a rear cam groove R is used for controlling a position of a rear lens group of the optical lens system of the lens unit 101. The front and rear lens groups are not moved independently, but they are synchronously moved in the same direction with respect to the right and left in FIG. 3A.

Symbols P0 and P0' respectively designate positions of the guide pins when the main switch S0 is turned off and the front and rear lens groups are collapsed inside the camera body 100 hereinafter abbreviated as collapsed state of the lens unit 101). A symbol PW designates standby sections of the cam grooves F and R when the focal length of the optical lens system of the lens unit 101 is set to be the shortest focal length W at the wide view end. Symbols P11 and P11' respectively designate standby positions of the guide pins when the focal length of the optical lens system of the lens unit 101 is set the shortest focal length W. Symbols P1 and P1' respectively designate positions of the guide pins when the optical lens system of the lens unit 101 is focused on an object at an infinite position under a condition that the focal length of the optical lens system of the lens unit 101 is set to the shortest focal length W. Symbols P2 and P2' respectively designate positions of the guide pins when the optical lens system of the lens unit 101 is focused on an object at the nearest position under the condition that the focal length of the optical lens system of the lens unit 101 is set to the shortest focal length W.

Likewise, symbols PM1 to PM3 respectively designate standby sections of the cam grooves F and R when the focal length of the optical lens system of the lens unit 101 is set to middle focal lengths M1 to M3. Symbols P3 and P3', P5 and P5', and P7 and P7' respectively designate positions of the guide pins when the optical lens system of the lens unit 101 is focused on the object at the infinite position under a condition that the focal length of the optical lens system of the lens unit 101 is set to the middle focal lengths M1 to M3. Symbols P4 and P4', P6 and P6', and P8 and P8' respectively designate positions of the guide pins when the optical lens system of the lens unit 101 is focused on the object at the nearest position under the condition that the focal length of the optical lens system of the lens unit 101 is set to the middle focal lengths M1 to M3. Symbols P12 and P12', P13 and P13', and P14 and P14' respectively designate standby positions of the guide pins when the focal length of the optical lens system of the lens unit 101 is set to the middle focal length M1 to M3.

A symbol PT designates standby sections of the cam grooves F and R when the focal length of the optical lens system of the lens unit 101 is set to be the longest focal length T at the telescopic end. Symbols P9 and P9' respectively designate positions of the guide pins when the optical lens system of the lens unit 101 is focused on the object at the infinite position under a condition that the focal length of the optical lens system of the lens unit 101 is set to the longest focal length T. Symbols P10 and P10' respectively designate positions of the guide pins when the optical lens system of the lens unit 101 is focused on the object at the nearest position under the condition that the focal length of the optical lens system of the lens unit 101 is set the longest focal length T. Symbols P15 and P15' respectively designate standby positions of the guide pins when the focal length of the optical lens system of the lens unit 101 is set the longest focal length T.

A symbol Z0 designates sections of the front and rear cam grooves F and R which are used for extending the front and rear lens groups from the collapsed position to a standby position at the wide view end of the focal length (hereinafter abbreviated as W standby position). Symbols Z1 to Z4 respectively designate sections of the front and rear cam grooves F and R which are used for moving the front and rear lens groups in order to vary or zoom the focal length of the optical lens system of the lens unit 101. Symbols F1 to F5 respectively designate sections of the front and rear cam grooves F and R which are used for focusing the optical lens system of the lens unit 101 on the object. As can be seen from FIG. 3A, the front and rear lens groups of the optical lens system of the lens unit 101 are moved, for example, corresponding to a rotation of a zooming ring on which the front and rear cams F and R are formed, so that both of the focal length control and the focusing of the optical lens system of the lens unit 101 can be executed.

A detailed configuration of the switching mechanism 300 is described with reference to FIGS. 4 to 18. As can be seen from the figures, the switching mechanism 300 comprises the following elements. A winding gear 321 is secured on an end of the output shaft 320 which is engaged with the film winding mechanism 120. A rewinding gear 331 is secured on an end of the output shaft 330 which is engaged with the film rewinding mechanism 130. A cam disc 400 is secured on an end of the output shaft 310 which is engaged with the zooming mechanism 150. The cam disc 400 is rotated corresponding to the position of the zooming mechanism 150. A first gear train 340 engages with a gear portion (not shown) which is formed on the cam disc 400 for rotating the cam disc 400, for example, in the clockwise direction in the figure. A second gear train 350 engages with the gear portion of the cam disc 400 for rotating the cam disc 400 in the counterclockwise direction in the figure. A planet gear 361 is rotatably pivoted on a revolution lever 362. The planet gear 361 engages with a speed reduction gear trains 360. The speed reduction gear train 360 engages with a motor gear 162 which is secured on an end of rotation shaft 161 of the motor 160. Thus, the planet gear 361 revolves around a rotation axis of the revolution lever 362 in a predetermined direction corresponding to a rotation direction of the rotation shaft 161 of the motor 160 (hereinafter abbreviated as rotation direction of the motor 160). A stopper lever 370 is biased to contact a side wall of the cam disc 400 and moves responding to the rotation of the cam disc 400 so as to restrict the revolution of the planet gear 361.

The planet gear 361 can selectively be engaged with one of the winding gear 321 and the rewinding gear 331 for transmitting the driving force (torque) of the motor 160 to the film winding mechanism 120 or the film rewinding mechanism 130. However, the winding gear 321 and the rewinding gear 331 are respectively disposed at positions where the revolution of the planet gear 361 is not restricted by the existence of the winding gear 321 and the rewinding gear 331. In a state shown in FIG. 4, when the revolution lever 362 and the planet gear 361 pivoted thereon revolve in the clockwise direction, the planet gear 361 engages with a first input gear 341 of the first gear train 340. Alternatively, when the revolution lever 362 and the planet gear 361 revolve in the counterclockwise direction, the planet gear 361 engages with a second input gear 351 of the second gear train 350.

A pulse generating disc 171 on which a predetermined pattern is formed is engaged with the motor gear 162. Thus, the rotation direction and the rotation speed of the rotation shaft 161 of the motor 160 can be known by detecting the motion of the pattern on the pulse generating disc 171 by an optical sensor 172 such as a photo-interrupter.

The cam disc 400, the revolution lever 361 and the stopper lever 370 are disposed on substantially the same first plane with respect to an axial direction of the output shaft 310. The motor gear 162, the winding gear 321, the rewinding gear 331, the first gear train 340, the second gear train 350, the speed reduction gear train 360, the planet gear 361 and the gear portion of the cam disc 400 are disposed on substantially the same second plane which is different from the first plane. Thus, the cam disc 400 does not interfere the first and second gear trains 340 and 350 in the axial direction of the output shaft 310.

The cam disc 400 rotates about one round while the front and rear lens groups of the optical lens system of the lens unit 101 move from the collapsed position to a telescopic end position. As can be seen from FIG. 4, five standby positions W, M1, M2, M3, and T are defined on the cam disc 400 corresponding to the five focal lengths W, M1, M2, M3 and T which can be selected as the focal length of the optical lens system of the lens unit 101. A part of side wall of the cam disc 400 between respective adjoining two standby positions W and M1, M1 and M2, M2 and M3, M3 and T, T and W are separated into first and second sections R1 and R2. In the first section R1, the zooming direction of the optical lens system of the lens unit 101, for example, toward the wide view side can be changeable toward the telescopic side, and vice versa. In the second section R2, the zooming direction of the optical lens system of the lens unit 101 cannot be changed. Portions of the side wall 400 corresponding to the second sections R2 are protruded from portions corresponding to the first sections R1. The contact portion 371 of the stopper lever 370 contacts the side wall of the cam disc 400.

Furthermore, a plurality of patterns 401 to 406 corresponding to the first sections R1 are formed on the cam disc 400 by which the rotation position (rotation angle) of the cam disc 400 can be detected. A chart showing a linear development of annular patterns 401 to 406 formed on the cam disc 400 is shown in FIG. 3B. The right and left of FIG. 3B coincide with those of FIG. 3A. It is assumed that a contact member (not shown) which slides on the cam disc 400 for detecting the patterns 401 to 406 is positioned on an equivalent position of the guide pins provided on lens barrels of the front and rear lens groups. The contact member is provided at a position, for example, on a line joining a contact point of the contact portion 371 of the stopper lever 370 and the side wall of the cam disc 400 to the center of the output shaft 310 of the cam disc 400. Thus, the rotation position of the cam disc 400 can be detected by counting the number of times of variation of output signal from a switch constituted by the patterns 401 to 406 and the contact member. As an example of the patterns 401 to 406, it is preferable that electrodes be formed on a printed circuit substrate and on and off of the contact member be detected electrically. Alternatively, it is preferable that bright and dark patterns be printed on a film and the patterns be detected optically by a photosensor. In summary, it is preferable that the sensor should detect the rotation angle or rotation position of the cam disc 400.

In a state that the contact portion 371 of the stopper lever 370 contacts the first section R1 on the side wall of the cam disc 400, a stopper portion 372 of the stopper lever 370 is shunted from the trail of the revolution lever 362, so that the planet gear 361 which is pivoted on the revolution lever 362 can be revolved freely between the first input gear 341 of the first gear train 340 and the second input gear 351 of the second gear train 350. When the motor 160 rotates in the clockwise direction, the planet gear 361 engages with the first input gear 341 of the first gear train 340 and the driving force of the motor 160 is transmitted to the first gear train 340. As a result, the cam disc 400 is rotated in the clockwise direction. Alternatively, when the motor 160 rotates in the counterclockwise direction, the planet gear 361 engages with the second input gear 351 of the second gear train 350 and the driving force of the motor 160 is transmitted to the second gear train 350. As a result, the cam disc 400 is rotated in the counterclockwise direction. As mentioned above, since the cam disc 400 is secured on the end of the output shaft 310 which is engaged with the zooming mechanism 150, the focal length of the optical lens system of the lens unit 101 can be varied from the wide view side to the telescopic side by the rotation of the cam disc 400, for example, in the clockwise direction. Alternatively, the focal length of the optical lens system of the lens unit 101 can be varied from the telescopic side to the wide view side by the rotation of the cam disc 400 in the counterclockwise direction. In other words, the zooming direction of the optical lens system of the lens unit 100 can be changed by control-
ling the rotation direction of the motor 160 when the contact portion 371 of the contact lever 370 contacts with the first section R1 on the side wall of the cam disc 400.

In a state that the contact portion 371 of the contact lever 370 contacts the second section R2 on the side wall of the cam disc 400, the stopper portion 372 of the stopper lever 370 is intruded into the trail of the revolution lever 362, so that the revolution of the revolution lever 362 is restricted. Thus, the planet gear 361 can be revolved alternative of only between the first input gear 341 of the first gear train 340 and the rewinding gear 331 and between the second input gear 351 of the second gear train 350 and the winding gear 321. In other words, even when the rotation direction of the motor 160 is changed under the condition that the contact portion 371 of the stopper lever 370 contacts the second section R2 on the side wall of the cam disc 400, it is impossible to change the zooming direction of the optical lens system of the lens unit 101.

Motions of the camera 100 in accordance with the embodiment is described below.

Motion When the Main Switch is Turned On

Figure 5:
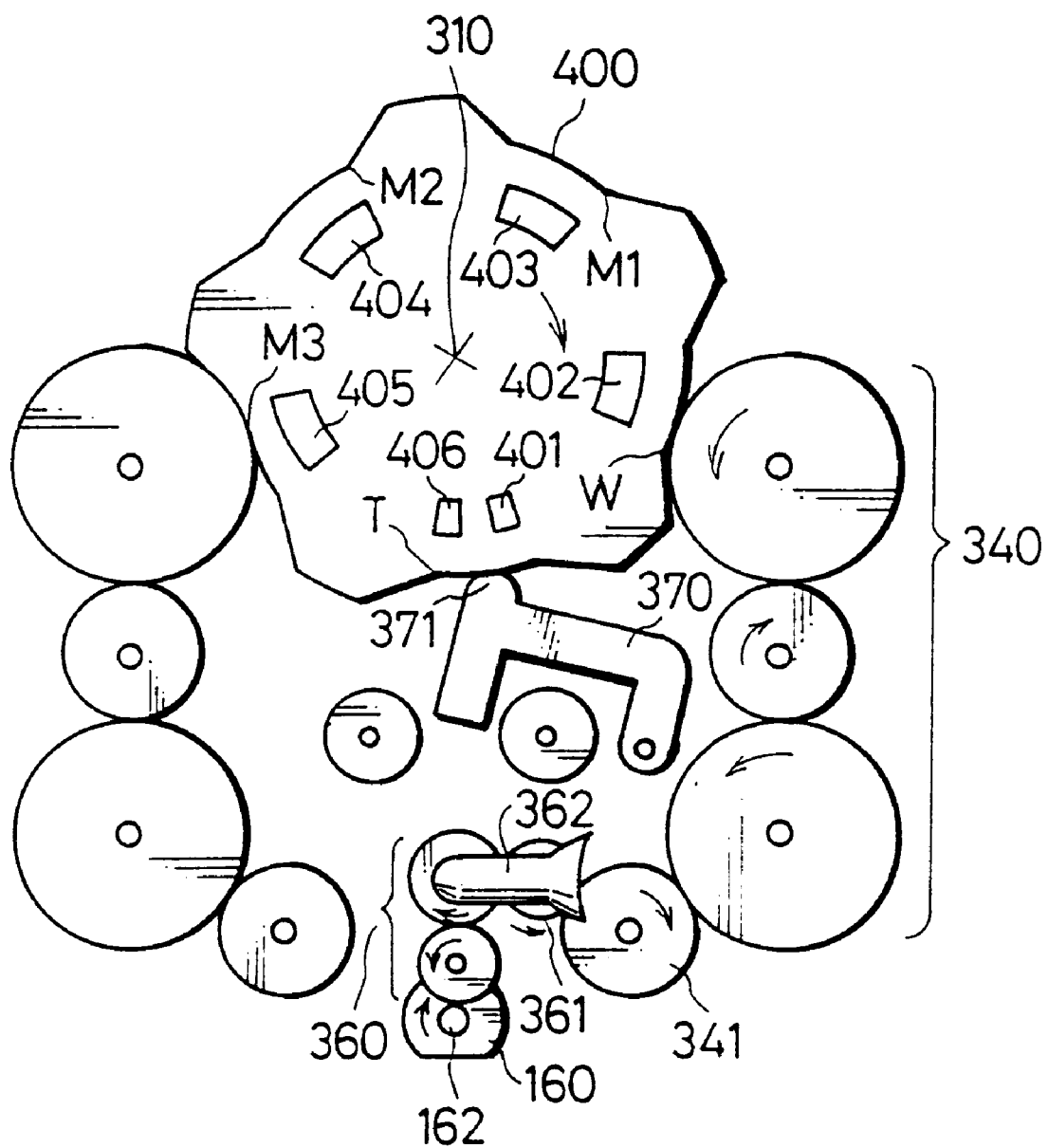
FIG. 5 is a plan view showing a collapsed state of the switching mechanism when an optical lens system is collapsed in a camera body in the embodiment.

When the main switch S0 has been turned off, the switching mechanism 300 has been stopped at a collapsed state shown in FIG. 5. The contact portion 371 of the stopper lever 370 contacts a portion on the side wall of the cam disc 400 corresponding to a middle position between the patterns 401 and 406. In this state, the planet gear 361 is not necessarily engaged with the first input gear 341 of the first gear train 340. When the main switch S0 is turned on, the control circuit 210 controls the motor 160 for rotating in the clockwise direction. In case that the planet gear 361 has not been engaged with the first input gear 341 of the first gear train 340, the revolution lever 362 pivoting the planet gear 361 revolves in the clockwise direction, so that the planet gear 361 engages with the first input gear 341. Subsequently, the driving force of the motor 160 is transmitted to the cam disc 400 via the motor gear 162, the speed reduction gear train 360, the planet gear 361 and the first gear train 340. Then, the cam disc 400 starts to rotate in the clockwise direction.

Figure 6:
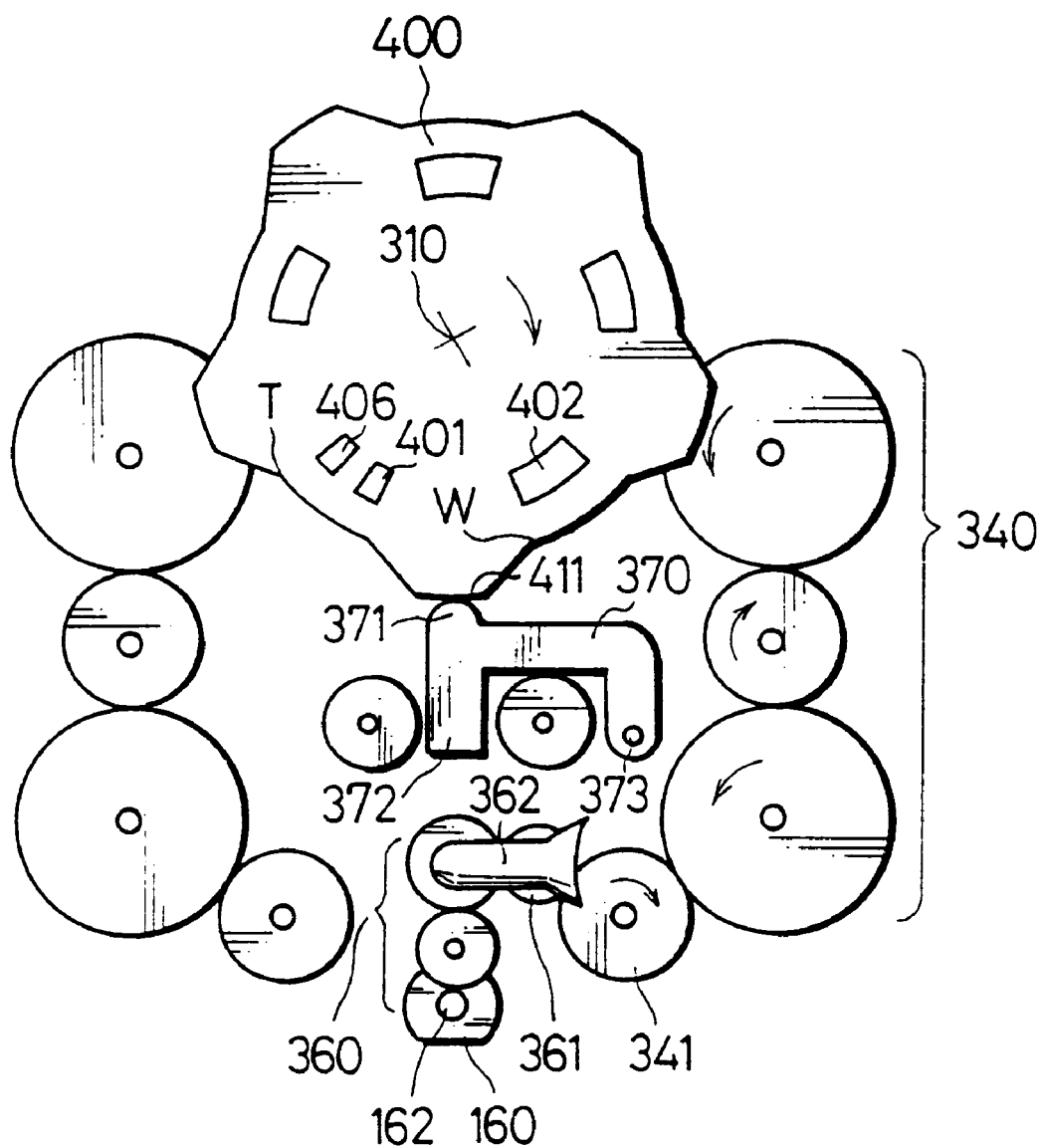
FIG. 6 is a plan view showing a middle state of the switching mechanism from the collapsed state to a W standby state when the focal length of the optical lens system is set as the shortest focal length W at the wide view end in the embodiment.

As shown in FIG. 6, when the cam disc 400 is rotated in the clockwise direction, the contact portion 371 of the stopper lever 370 contacts the most protruded portion 411 on the side wall of the cam disc 400, so that the stopper lever 370 revolves in the counterclockwise direction around the shaft 373. As a result, the stopper portion 372 of the stopper lever 370 intrudes into the trail of the revolution lever 362. However, the revolution lever 362 receives a revolving force in the clockwise direction owing to the driving force of the motor 160, so that the revolution lever 362 does not contact with the stopper portion 372 of the stopper lever 370.

When the cam disc 400 further rotates in the clockwise direction, the contact portion 371 of the stopper lever 370 passes through the most protruded portion 411 on the side wall of the cam disc 400. Simultaneously, the control circuit 210 starts to count a number of times of variation of an output signal from the encoder 170 (see FIG. 1 or FIG. 4) when it receives a detection signal of an edge 401-2 (see FIG. 3B) from the above-mentioned electric sensor. For example, the detection signal is generated when the contact member passes the edge 401-2 shown in FIG. 3B. When the counted number reaches to a predetermined number (corresponding to a moving quantity of the contact member from the edge 401-2 to a position P11 in FIGS. 3A and 3B), the control circuit 210 controls the motor 160 to stop the rotation thereof. As a result, the contact portion 371 of the stopper lever 370 contacts a portion on the side wall of the cam disc 400 in the vicinity of the standby position W shown in FIG. 7. Since the output shaft 310 on which the cam disc 400 is secured is rotated at a predetermined angle in the clockwise direction, the zooming mechanism 150 which is engaged with the output shaft 310 is driven from the wide view side to the telescopic side. For example, the guide pin of the rear lens group is moved from the position P0 to the position P11 in FIG. 3A by the zooming mechanism 150. The front and rear lens groups are respectively positioned to take the shortest focal length W at the wide view end, so that the focal length of the optical lens system of the lens unit 101 is set as the shortest focal length W. Hereinafter, the state that the focal length of the optical lens system on the lens unit 101 is set as the shortest focal length W but the focusing of the optical lens system is not executed is abbreviated as W standby state.

Zooming Motion from W to M1

Zooming motion of the optical lens system of the lens unit 101 from the shortest focal length W to the middle focal length M1 is described. Under the W standby state shown in FIG. 7, when the telescopic switch S4 of the zooming switch 105 of the camera 100 is turned on, the control circuit 210 controls the motor 160 so as to rotate the cam disc 400 in the clockwise direction via the motor gear 162, the speed reduction gear train 360, the planet gear 361 and the first gear train 340.

Figure 8:
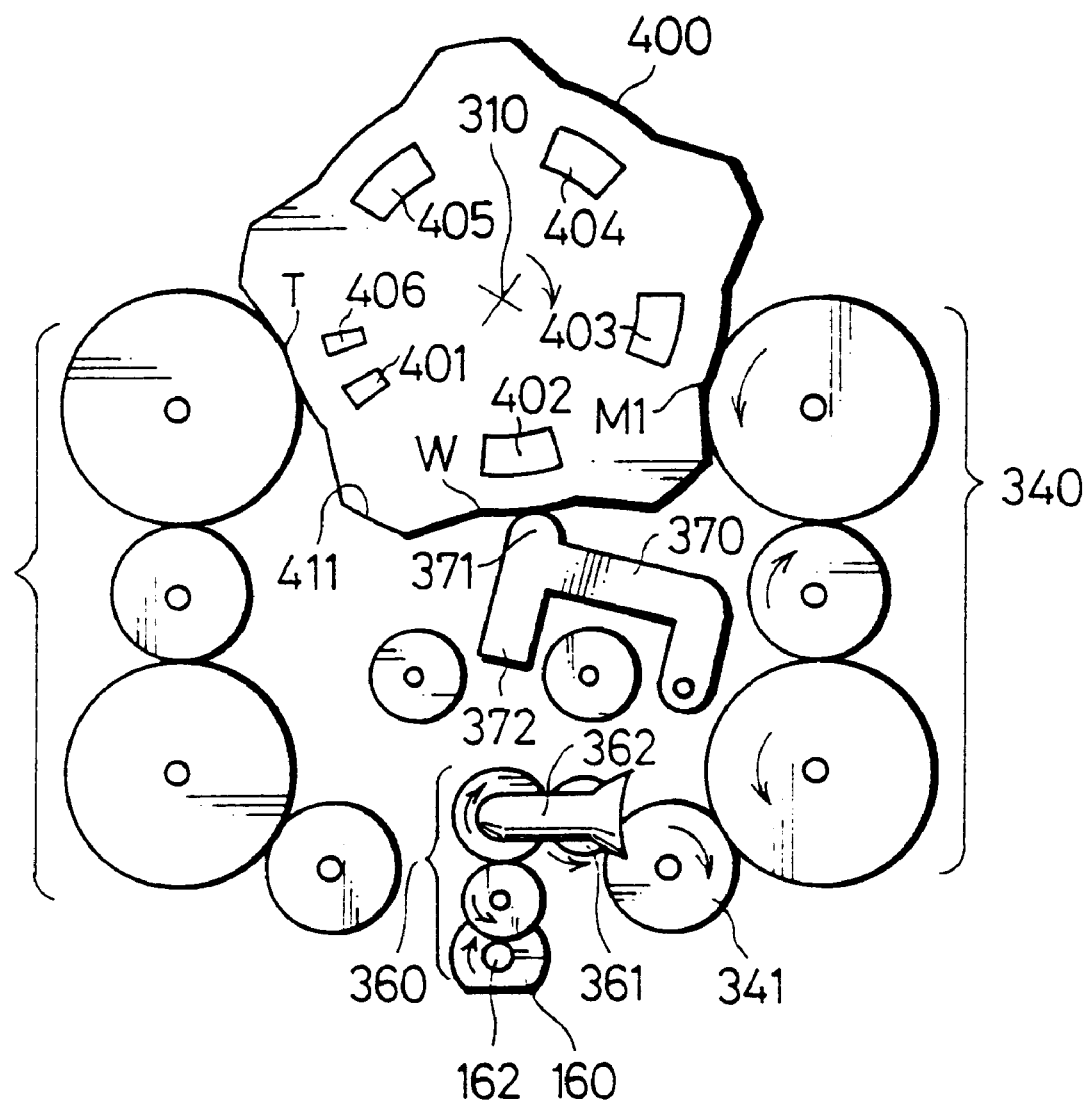
FIG. 8 is a plan view showing a middle state of the switching mechanism moving from the W standby state to a M1 standby state when the focal length of the optical lens system is set as a middle focal length M1 in the embodiment.
Figure 9:
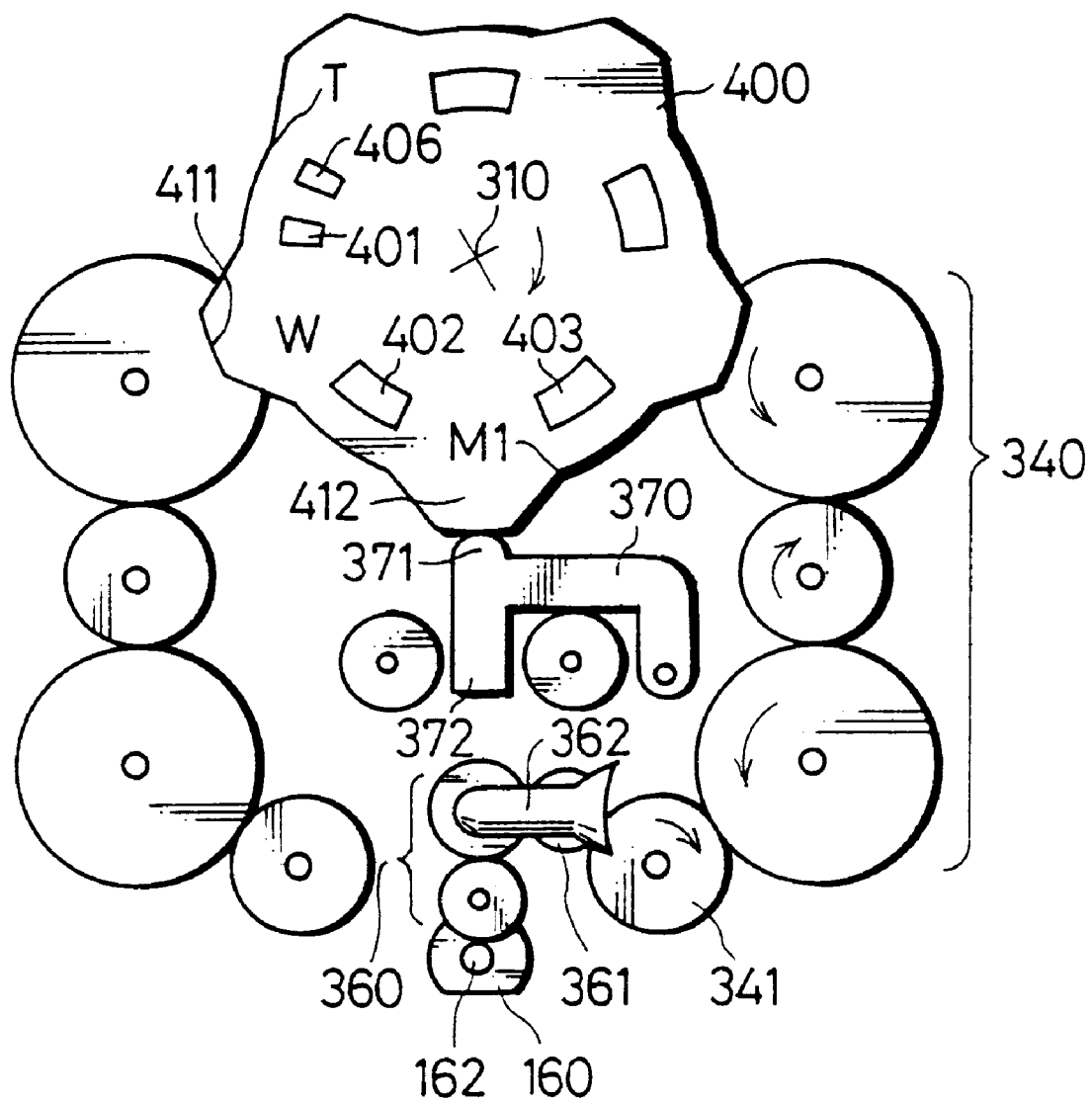
FIG. 9 is a plan view showing another middle state of the switching mechanism moving from the W standby state to the M1 standby state in the embodiment.
Figure 10:
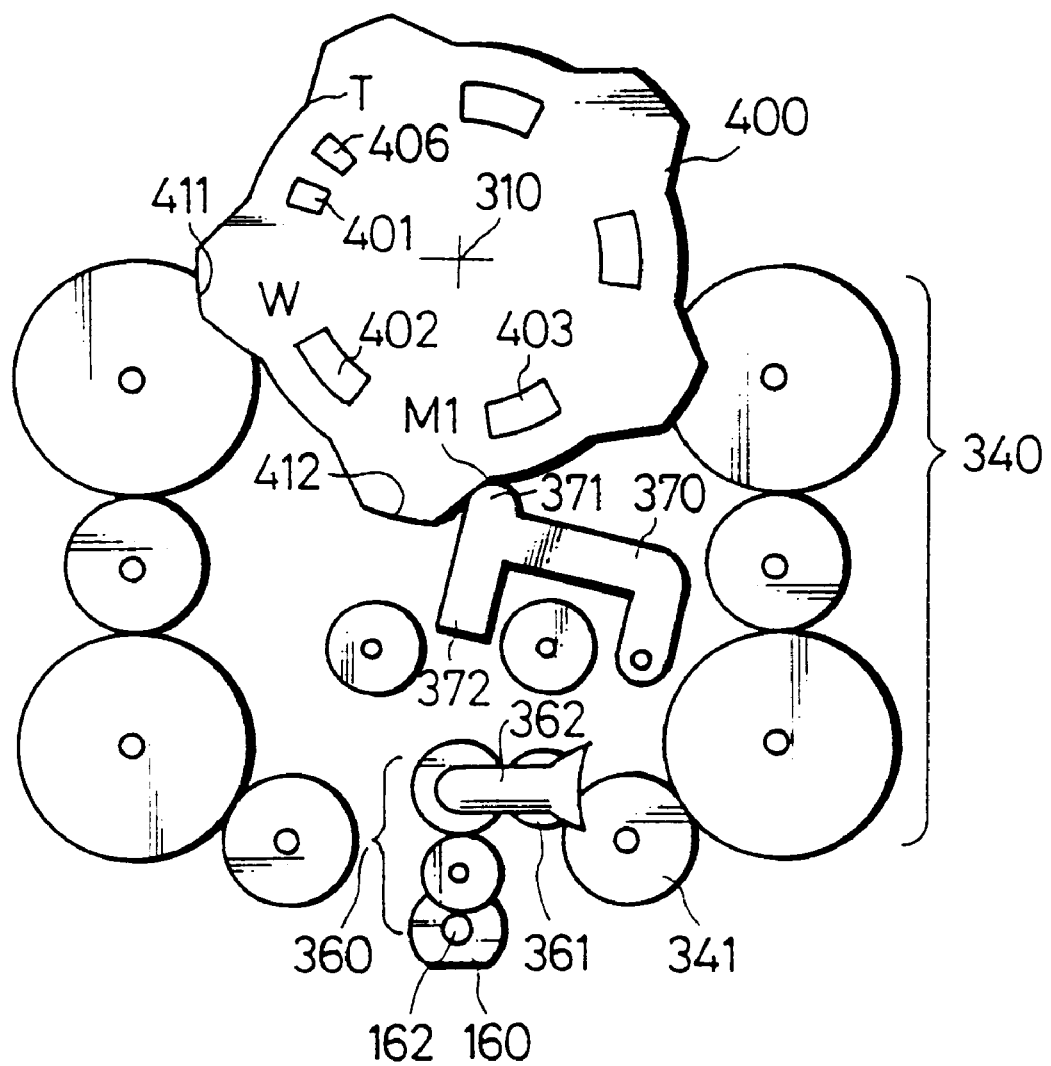
FIG. 10 is a plan view showing the M1 standby state of the switching mechanism in the embodiment.

Following to the rotation of the cam disc 400, the contact portion 371 of the stopper lever 370 serially passes a portion facing the pattern 402 shown in FIG. 8 and the most protruded portion 412 shown in FIG. 9 and finally stops at a portion in the vicinity of the standby position M1 shown in FIG. 10. Simultaneously, the control circuit 210 starts to count the number of times of variation of the output signal from the encoder 170 when it receives the detection signal of the edge 402-2 from the electric sensor. When the counted number reaches to a predetermined number corresponding to a moving quantity of the contact member from the edge 402-2 to a position P12 in FIGS. 3A and 3B, the control circuit 210 controls the motor to stop the rotation thereof. The zooming mechanism 150 is driven from the wide view side to the telescopic side. The guide pin of the rear lens group is moved from a position P11 to a position P12 through positions P1 and P2 in FIG. 3A by the zooming mechanism 150. As a result, the front and rear lens groups are respectively positioned to take the middle focal length M1, so that the focal length of the optical lens system of the lens unit 101 is set as the middle focal length M1. Hereinafter, the state that the focal length of the optical lens system on the lens unit 101 is set as the middle focal length M1 but the focusing of the optical lens system is not executed is abbreviated as M1 standby state.

Motions for changing the focal length of the optical lens system of the lens unit 101 from M1 to M2, from M2 to M3, and from M3 to T are substantially the same, so that the explanation of these motions are omitted.

Zooming Motion From M1 to W

Zooming motion of the focal length of the optical lens system of the lens unit 101 from the middle focal length M1 to the shortest focal length W is described. Under the M1 standby state shown in FIG. 10, the contact portion 371 of the stopper lever 370 contacts the portion on the side wall of the cam disc 400 in the vicinity of the standby position M1, and the stopper portion 372 is shunted from the trail of the revolution lever 362. Under this state, when the wide view switch S3 of the zooming switch 105 of the camera 100 is turned on, the control circuit 210 controls the motor 160 for rotating in the counterclockwise direction. The revolving lever 362 with the planet gear 361 revolves in the counterclockwise direction by the revolving force due to the rotation of the motor 160 in the counterclockwise direction, so that the planet gear 361 engages with the second input gear 351 of the second gear train 350. Furthermore, the driving force of the motor 160 is transmitted to the cam disc 400 via the motor gear 162, the speed reduction gear train 360, the planet gear 361 and the second gear train 350, so that the cam disc 400 starts to rotate in the counterclockwise direction.

Figure 11:
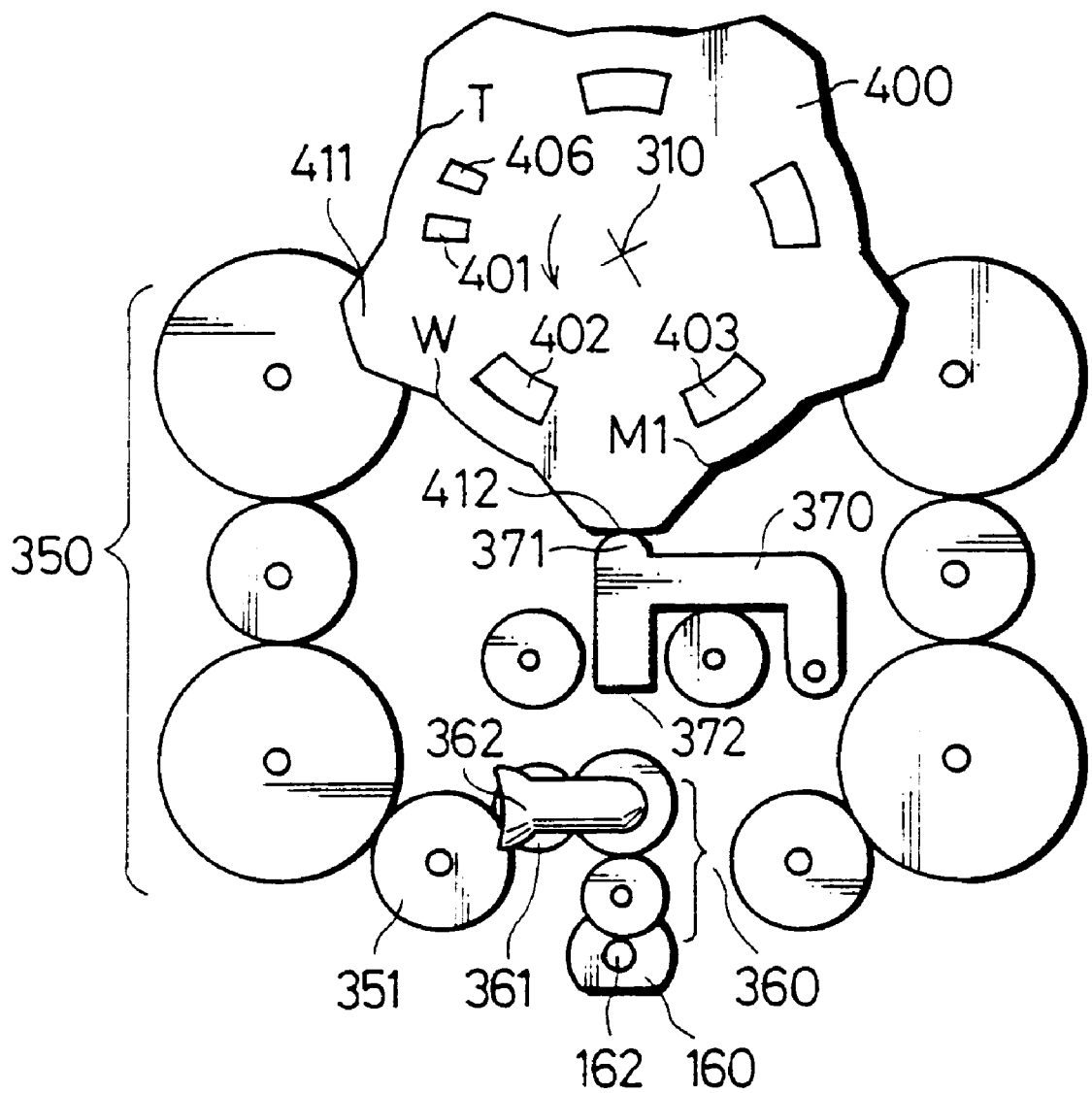
FIG. 11 is a plan view showing a middle state of the switching mechanism returning from the M1 standby state to the W standby state in the embodiment.
Figure 12:
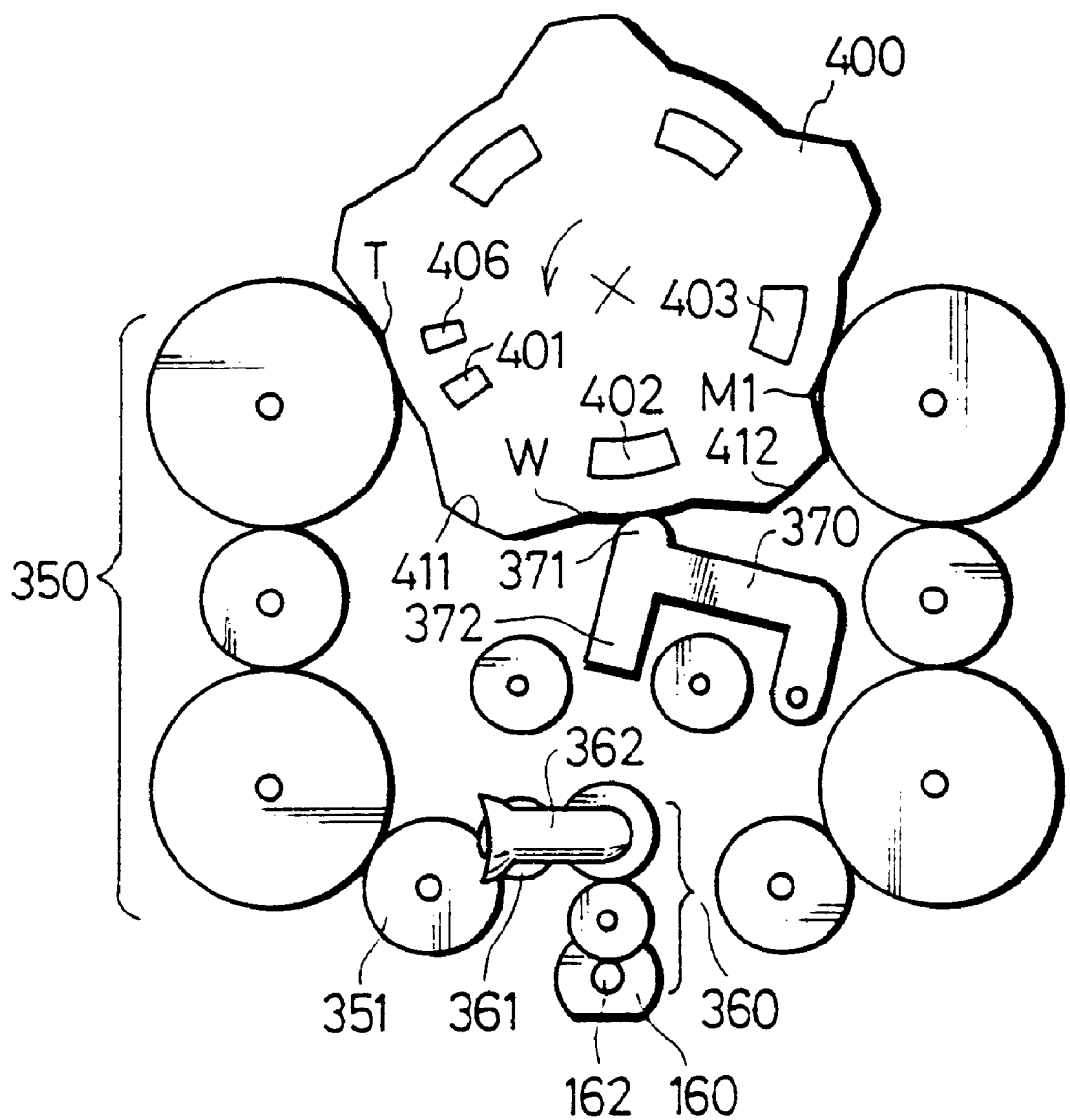
FIG. 12 is a plan view showing another middle state of the switching mechanism returning from the M1 standby state to the W standby state in the embodiment.
Figure 13:
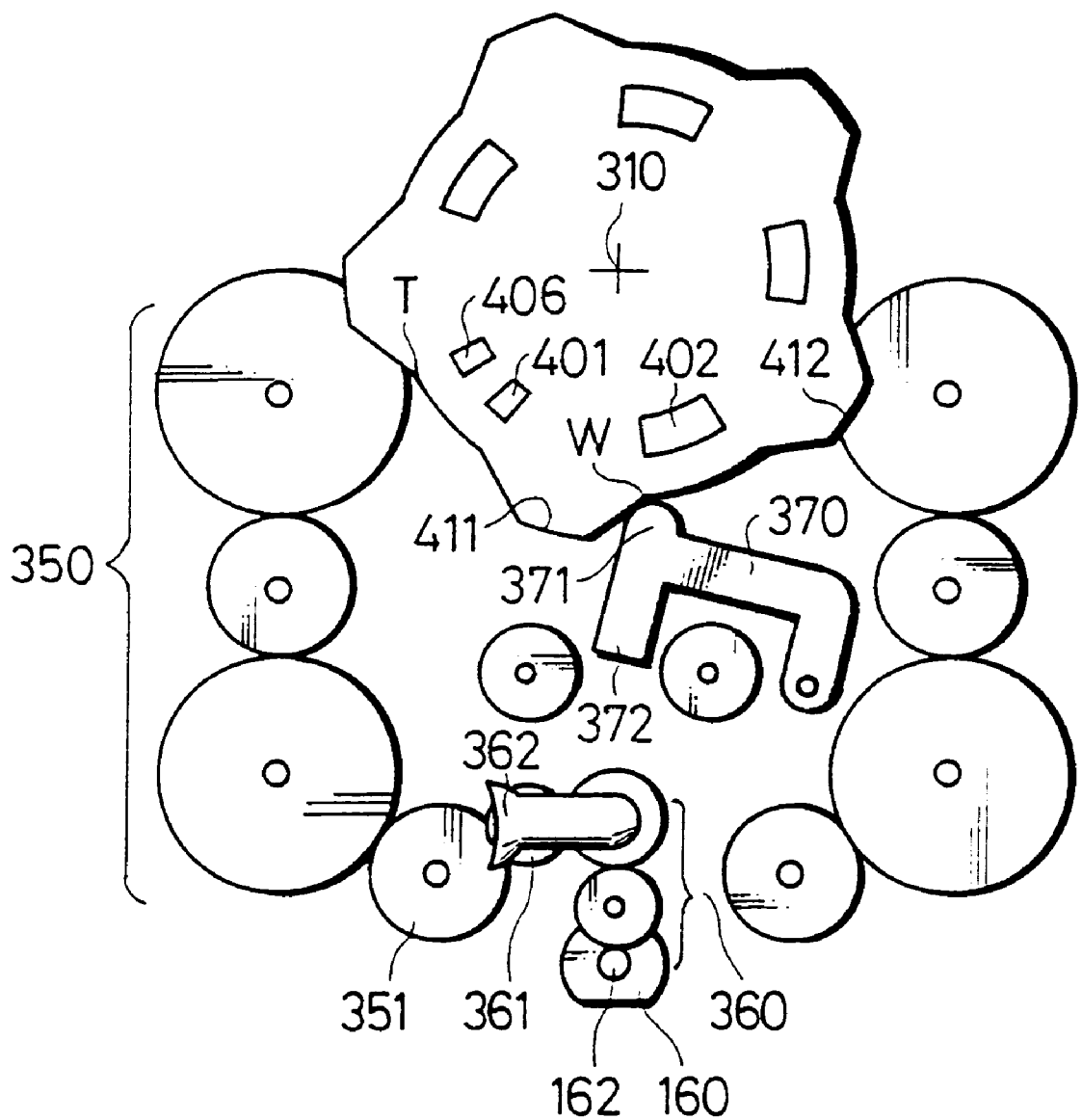
FIG. 13 is a plan view showing another W standby state of the switching mechanism in the embodiment.

Following to the rotation of the cam disc 400, the contact portion 371 of the stopper lever 370 serially passes the most protruded portion 412 on the side wall of the cam disc 400 shown in FIG. 11 and a portion facing the pattern 402 shown in FIG. 12 and finally stops at a portion in the vicinity of the standby position W shown in FIG. 13. Simultaneously, the control circuit 210 receives the detection signals from the electric sensor showing the detection of the edges 402-2 and 402-1 shown in FIG. 3B. The control circuit 210, however, starts to count the number of times of variation of the output signal from the encoder 170 when it receives the detection signal of the edge 402-1. When the counted number reaches to a predetermined number corresponding to a moving quantity of the contact member from the edge 402-1 to the position P11 in FIGS. 3A and 3B, the control circuit 210 controls the motor 160 to stop the rotation thereof. The zooming mechanism 150 is driven from the telescopic side to the wide view side. The guide pin of the rear lens group is moved from the position P12 to the position P11 through the positions P2 and P1 in FIG. 3A by the zooming mechanism 150. As a result, the front and rear lens groups are respectively positioned to take the shortest focal length W, so that the focal length of the optical lens system of the lens unit 101 is set as the shortest focal length W. The camera 100 or the switching mechanism 300 returns to the W standby state.

Motions for changing the focal length of the optical lens system of the lens unit 101 from T to M3, from M3 to M2, and from M2 to M1 are substantially the same, so that the explanation of these motions are omitted.

Focusing Motion

Figure 7:
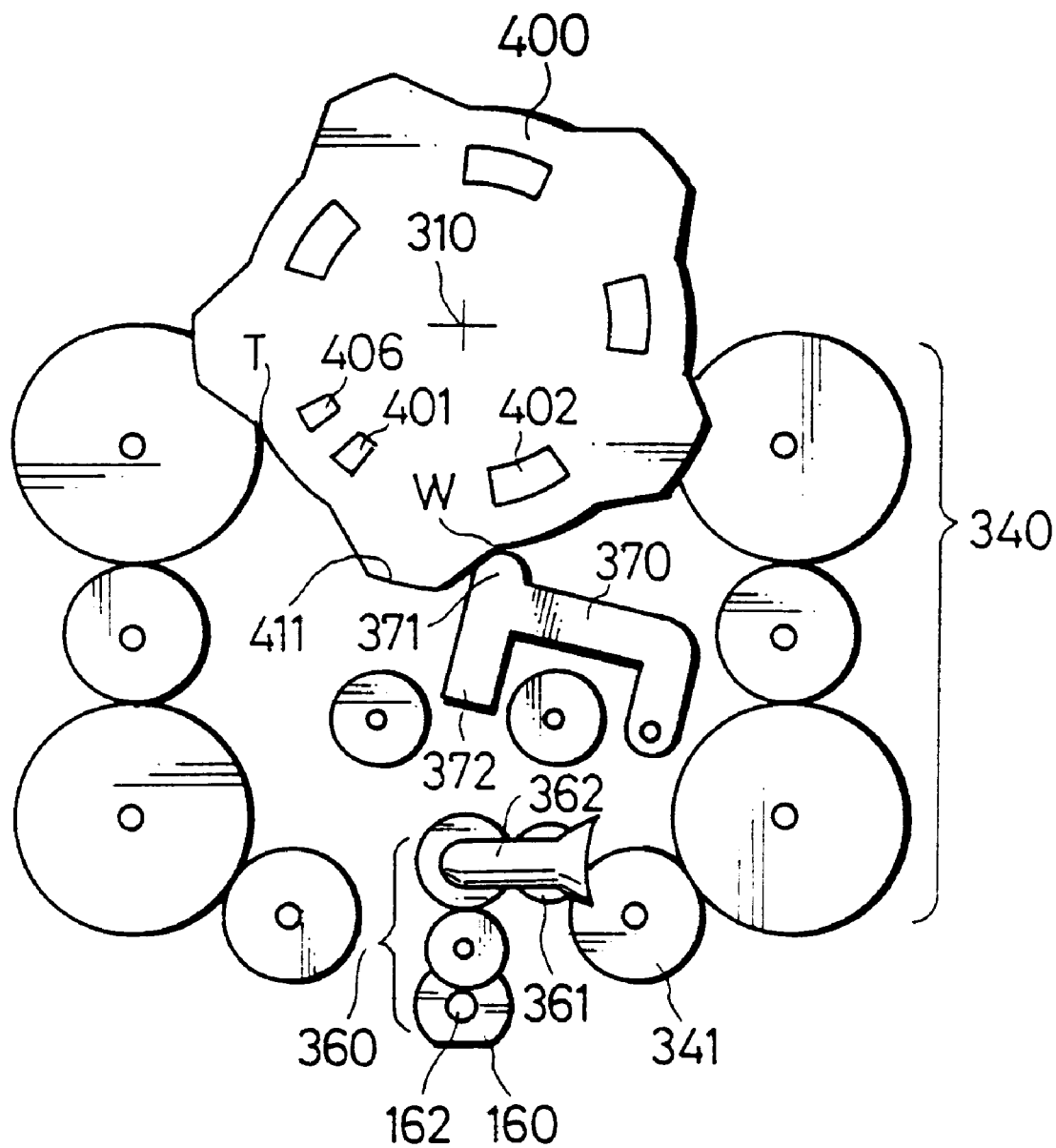
FIG. 7 is a plan view showing the W standby state of the switching mechanism in the embodiment.

Focusing motion of the optical lens system of the lens unit 101 from the W standby state shown in FIG. 7 or 13 is described. As can be seen from FIG. 3A, the focusing motion is executed under the state that the contact portion 371 of the contact lever 370 contacts the first sections R1 facing the patterns 402 to 406 on the side wall of the cam disc 400. In the focusing motion of the optical lens system of the lens unit 101, the zooming mechanism 150 is driven from the wide view side to the telescopic side. The guide pin of the rear lens group is moved from the position P11 to a position between the positions P1 and P2 in FIG. 3A.

As mentioned above, the focusing sensor 103 of the camera 100 is active type, so that the focusing sensor 103 detects the absolute distance to the object independently from the movement of the lens unit 101. Thus, the control circuit 210 calculates the rotation number of the motor 160 which is necessary for focusing the optical lens system of the lens unit 101 from the output signal of the focusing sensor 103, and controls the motor 160 so as to rotate the calculated number in clockwise direction. When the cam disc 400 starts to rotate, the control circuit 210 receives the detection signal of the edge 402-1 from the electric sensor and starts to count the number of times of variation of the output signal from the encoder 170. When the counted number of variation reaches to a predetermined number, the control circuit 210 controls the motor 160 to stop the rotation thereof. The state of the switching mechanism 300 is substantially the same as that shown in FIG. 8.

Since the focusing motion of the optical lens system of the lens unit 101 is executed under the sate that the contact portion 371 of the stopper lever 370 contacts the first section R1 on the side wall of the cam disc 400, the stopper portion 372 of the stopper lever 370 is shunted from the trail of the revolution lever 362. When the focusing motion is completed, the planet gear 361 pivoted on the revolution lever 362 can freely be revolved between the first input gear 341 of the first gear train 340 and the second input gear 351 of the second gear train 350. Thus, it is possible to expose the film 201 and to proceed to the winding motion after the focusing motion is completed. Alternatively, it is possible to return to the focusing motion again.

Film Winding Motion

Winding motion for winding the film by the length of one frame after exposing the film is described. It is assumed that the film 201 is exposed under the state shown in FIG. 8. The control circuit 210 controls the motor 160 for rotating in the counterclockwise direction so as to engage the planet gear 361 with the second input gear 351 of the second gear train 350. After engaging the planet gear 361 with the second input gear 351, the control circuit 210 further rotates the motor 160 for transmitting the driving force of the motor 160 to the cam disc 400 via the motor gear 162, the speed reduction gear 360, the planet gear 361 and the second gear train 350. Thus, the cam disc 400 is rotated in the counterclockwise direction.

Figure 14:
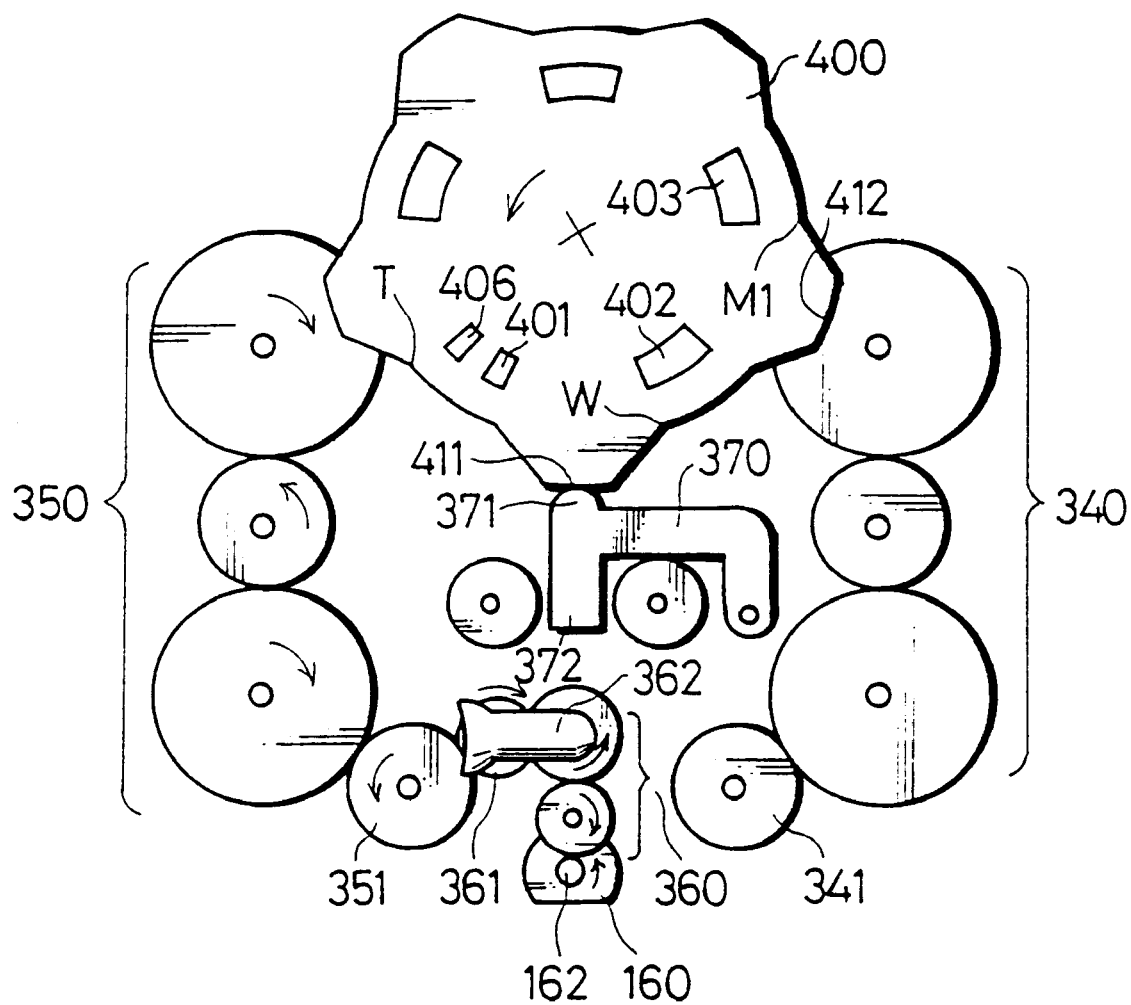
FIG. 14 is a plan view showing a preparation state of the switching mechanism for winding motion of the film in the embodiment.
Figure 15:
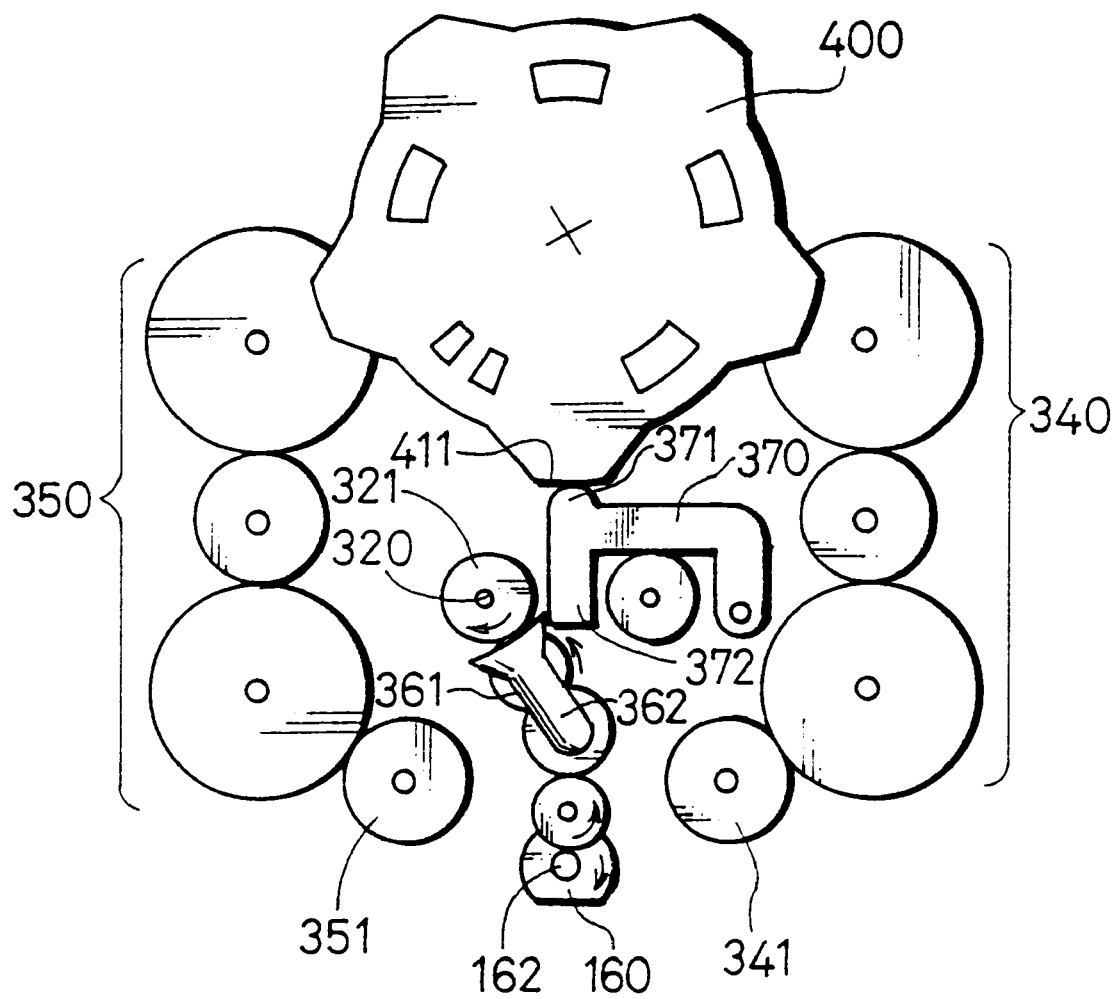
FIG. 15 is a plan view showing a middle state of the switching mechanism in the winding motion of the film in the embodiment.

As shown in FIG. 14, when the contact portion 371 of the stopper lever 370 contacts the most protruded portion 411 on the side wall of the cam disc 400, the stopper lever 370 is revolved around the rotation shaft thereof in the counterclockwise direction. Thus, the stopper portion 372 of the stopper lever 370 intrudes into the trail of the revolution lever 362 and stops at the position. When the cam disc 400 starts to rotate, the control circuit 210 receives the detection signal of the edge 402-1 from the electric sensor, and it starts to count the number of times of variation of the output signal from the encoder 170. When the counted number of variation reaches to a predetermined number corresponding to a moving quantity of the contact member from the edge 402-1 to a middle position of the second section R2, the control circuit 210 controls the motor 160 to stop the rotation thereof. Under this state, when the control circuit 210 controls the motor 160 reversely to rotate in the clockwise direction, the revolution lever 362 and the planet gear 361 pivoted on the revolution lever 362 start to revolve in the clockwise direction. However, the stopper portion 372 of the stopper lever 370 has been intruded into the trail of the revolution lever 362, so that the revolution lever 362 and the stopper lever 370 contacts and the revolution lever 362 cannot revolve no more, as shown in FIG. 15.

Under the state that the revolution lever 362 contacts with the stopper lever 370, the planet gear 361 engages with the winding gear 321. When the motor 160 further rotates in the clockwise direction, the driving force of the motor 160 can be transmitted to the winding gear 321. As shown in FIG. 1, the output shaft 320 on which the winding gear 321 is secured engages with the film winding mechanism 120, so that the film 201 can be wound by a predetermined length corresponding to one frame by the film winding mechanism 120. The predetermined length corresponding to one frame can be controlled by detecting perforations formed on the film 201 by a mechanical sensor or an electrical sensor (not shown).

Figure 16:
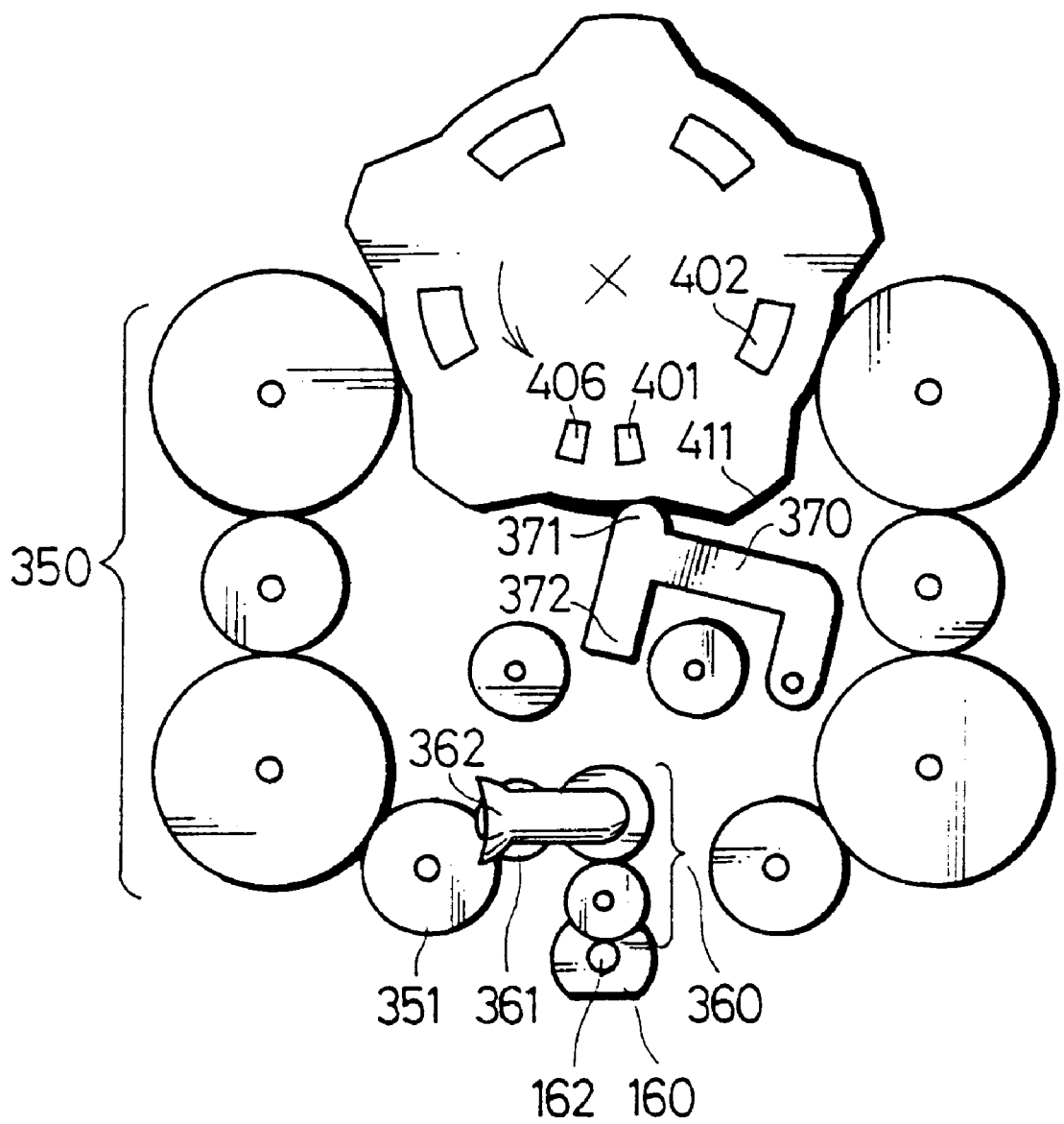
FIG. 16 is a plan view showing a middle state of the switching mechanism returning from the winding motion of the film to the W standby state in the embodiment.

When the film winding motion is completed, the control circuit 210 controls the motor 160 for rotating in the counterclockwise direction so as to engage the planet gear 361 with the second input gear 351 of the second gear train 350. Thereby, the switching mechanism 300 returns to the state shown in FIG. 14. The control circuit 210 further controls the motor 160 so as to stop the cam disc 400 at a position where the contact portion 371 of the contact lever 370 passes through the most protruded portion 411 on the side wall of the cam disc 400 as shown in FIG. 16. Simultaneously, when the control circuit 210 receives the detection signal of the edge 401-2 from the electric sensor while the cam disc 400 is rotated, the control circuit 210 controls the motor 160 to stop the rotation thereof. The cam disc 400 actually stops at a position where the contact member of the electric sensor passes the edge 401-2 of the pattern a little toward the collapsed position. At this time, the contact portion 372 of the contact lever 370 is shunted from the trail of the revolution lever 362.

Subsequently, the control circuit 210 controls the motor 160 for rotating in the clockwise direction so as to revolve the revolution lever 362 and the planet gear 361. As a result, the planet gear 361 engages with the first input gear 341 of the first gear train 340. The control circuit 210 further controls the motor 160 for rotating in the clockwise direction so as to return the switching mechanism 300 in the W standby state shown in FIG. 7 through the state shown in FIG. 6. When the control circuit 210 receives the detection signal of the edge 401-2 from the electric sensor, the control circuit 210 starts to count the number of times of variation of the output signal from the encoder 170. When the counted number of variation reaches to a predetermined number corresponding to a moving quantity of the contact member from the edge 401-2 to the position P11, the control circuit 210 controls the motor 160 to stop the rotation thereof.

The motion of the camera 100 in the focusing motion and the film winding motion observed from the outside of the camera is described. When the shutter release button 106 is pushed down, the lens unit 101 is pushed out a first length from the camera 100. After the shutter is released, the lens unit 101 is pulled a second length which is a little longer than the first length into the camera 100. During this motion, the driving noise of the film winging mechanism 120 can be heard. When the film winding motion is completed, the lens unit 101 is further pulled a few of third length into the camera 100. After that, the lens unit 101 is pushed out a fourth length from the camera 100. As a result, the lens unit 101 stops at the W standby state initially. These motions can be applied not only when the focal length of the optical lens system of the lens unit 101 is set as the shortest focal length W, but also when the focal length is set to one of the middle focal lengths M1 to M3 and the longest focal length T. Hereupon, (first length)+(fourth length)=(second length)+(third length).

Film Rewinding Motion From the Standby State

With respect to the film rewinding motion, three cases can be considered. At first, the rewinding motion from the standby state, for example, shown in FIG. 7 is described. Other two cased will be described below. This motion corresponds to a film rewinding motion when a predetermined number of frames is exposed on a film, for example, in a new photographic system where the number of frames is previously decided, or when the film rewind switch 121 is turned on before all the frames on the film 201 are exposed.

Figure 17:
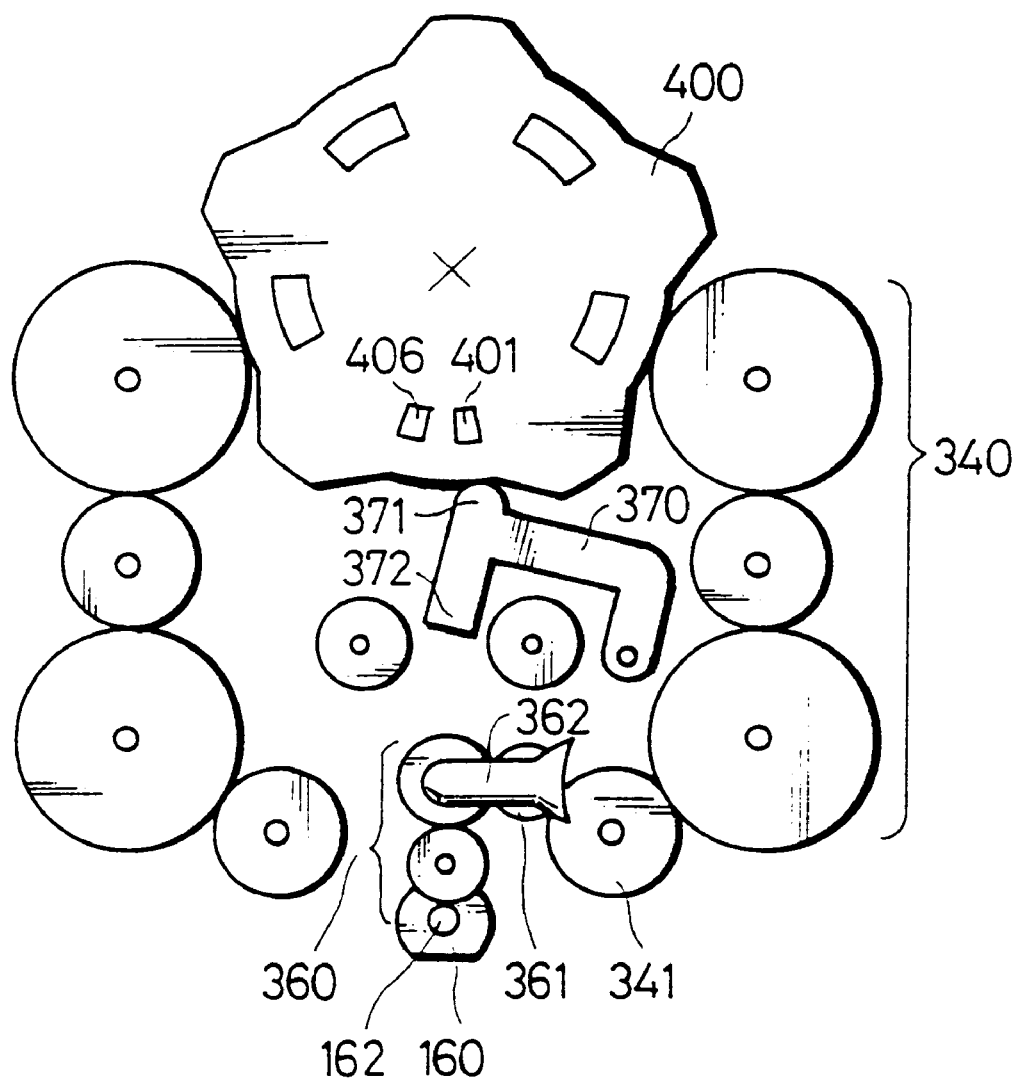
FIG. 17 is a plan view showing a preparation state of the switching mechanism for rewinding motion of the film in the embodiment.

The control circuit 210 controls the motor 160 for rotating in the counterclockwise direction from the W standby state shown in FIG. 7 so as to engage the planet gear 361 with the second input gear 351 of the second gear train 350. Furthermore, the control circuit 210 controls the motor 160 so as to stop the rotation of the can disc 400 in the counterclockwise direction in the state shown in FIG. 16. Hereupon, the stop and reverse of the rotation of the motor 160 or the cam disc 400 is controlled by using the detection signal of the edge 401-2 from the electric sensor. Subsequently, the control circuit 210 turns the rotation direction of the motor 160 to the clockwise direction so as to engage the planet gear 361 with the first input gear 341 of the first gear train 340 as shown in FIG. 17. Furthermore, the control circuit 210 controls the motor 160 so as to rotate the cam disc 400 in the clockwise direction and to stop the cam disc 400 in the state shown in FIG. 6. The control circuit 210 starts to count the number of times of variation of the output signal from the encoder 170 when it receives the detection signal of the edge 401-2 from the electric sensor. When the counted number reaches to a predetermined number corresponding to a moving quantity of the contact member from the edge 401-2 to a middle position of the second section R2, the control circuit 210 stops the rotation of the motor 160.

Figure 18:
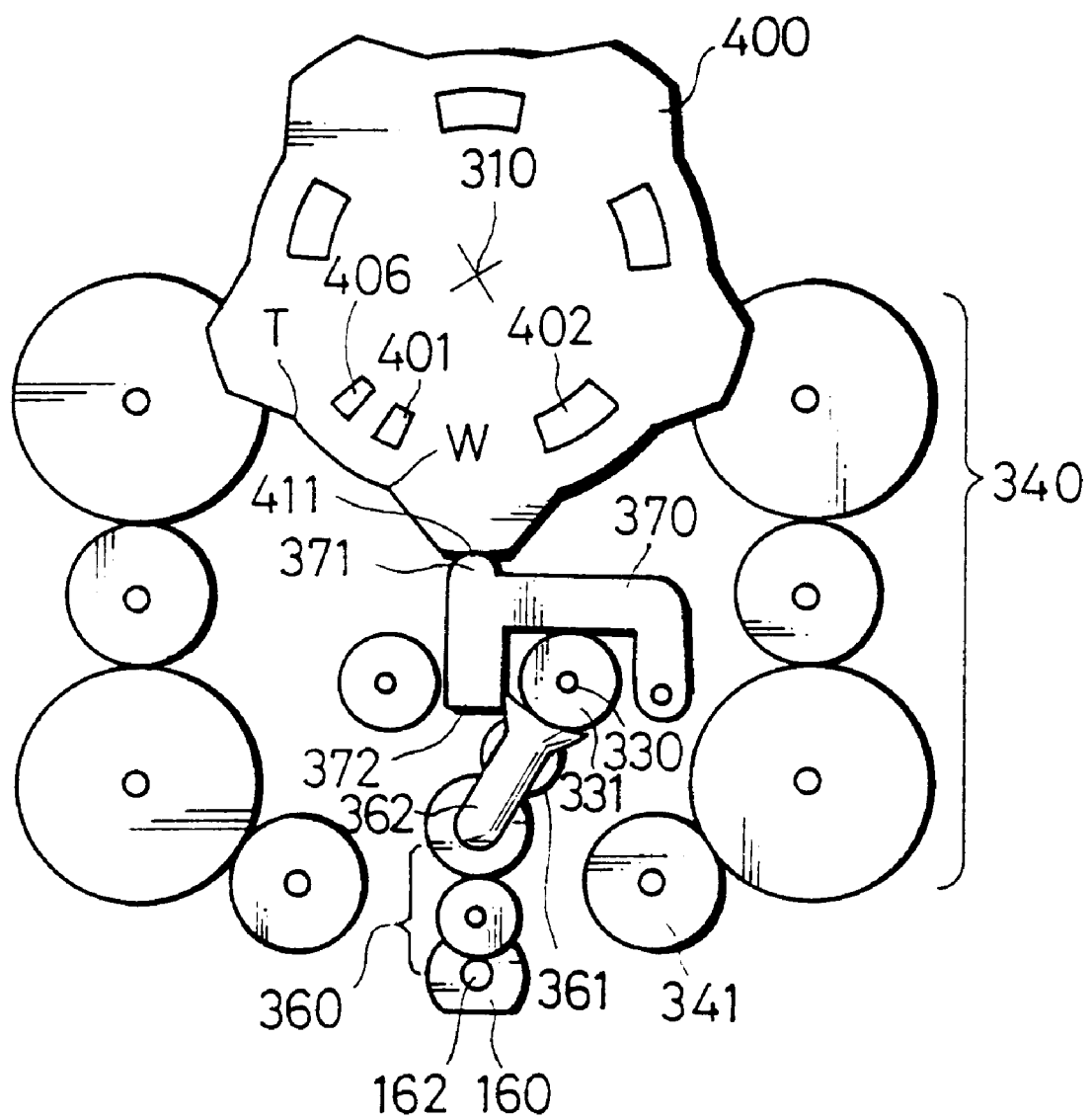
FIG. 18 is a plan view showing a middle state of the switching mechanism in the rewinding motion of the film in the embodiment.

In the state shown in FIG. 6, the contact portion 371 of the stopper lever 370 contacts the most protruded portion 411 on the side walls of the cam disc 400, and the stopper portion 372 of the stopper lever 370 intrudes in the trail of the revolution lever 362. The control circuit 210 further controls the motor 160 for rotating in the counterclockwise direction so as to revolve the revolution lever 362 and the planet gear 361. However, since the stopper portion 372 of the stopper lever 370 intrudes into the trail of the revolution lever 362, the revolution lever 362 contacts the stopper lever 370 as shown in FIG. 18. As a result, the revolution lever cannot revolve no more.

Under the state that the revolution lever 362 contacts the stopper lever 370, the planet gear 361 engages with the rewinding gear 331. When the motor 160 is further rotated in the counterclockwise direction, the driving force of the motor 160 can be transmitted to the rewinding gear 331. The output shaft 330 on which the rewinding gear 331 is secured engages with the film rewinding mechanism 130. Thus, the exposed film 201 can be rewinded into the film cartridge 200 by the film rewinding mechanism 130.

When the rewinding motion of the film is completed, the control circuit 210 controls the motor 160 for rotating in the clockwise direction so as to engage with the planet gear 361 with the first input gear 341 of the first gear train 340. As a result, the switching mechanism 300 returns to the W standby state shown in FIG. 7. Simultaneously, the control circuit 210 continues to count the number of times of variation of the output signal from the encoder 170 when it receives the detection signal of the edge 401-2 from the electric sensor. When the counted number reaches to a predetermined number corresponding to a moving quantity of the contact member from the middle position of the second section R2 to the position P11, the control circuit 210 controls the motor 160 to stop the rotation thereof.

Hereupon, the film rewinding motion can be executed by rotating the motor 160 in the clockwise direction from the W standby state shown in FIG. 7 to the state shown in FIG. 9. However, when the film rewinding motion is completed, the focal length of the optical lens system of the lens unit 101 which was previously set, for example, at the shortest focal length W varies to the middle focal length M1. Thus, this rewinding motion is not preferable.

The motion of the camera 100 in the film rewinding motion observed from the outside of the camera is described. When the film rewind switch 121 is turned on, the lens unit 101 is pulled a fifth length from the W standby position into camera 100. After that, the lens unit 101 is pushed out a few of sixth length from the camera 100. During these motions, the driving noise of the film rewinding mechanism 130 can be heard. When the film rewinding motion is completed, the lens unit 101 is further pushed out a few of seventh length from the camera 100. As a result, the lens unit 101 stops at the W standby state. These motions can be applied not only when the focal length of the optical lens system of the lens unit 101 is set as the shortest focal length W, but also when the focal length is set to one of the middle focal lengths M1 to M3 and the longest focal length T. Hereupon, (fifth length)=(sixth length)+(seventh length).

Film Rewinding Motion From the Film Winding Motion

Film rewinding motion in the middle state of the film winding motion, for example, shown in FIG. 15 is described. This motion corresponds to the rewinding motion when the film winding is stopped, for example, in the conventional 135 size film system where the number of frames on a film is not previously decided.

When the film 201 is finished in the middle of the film winding motion, the motor 160 cannot rotate no more, and an overcurrent flows in the motor 160. The state of the switching mechanism 300 at that time is shown in FIG. 15. When the overcurrent flowing in the motor 160 is detected, the control circuit 210 judges the film 201 is finished, and cuts off the current to the motor 160. Subsequently, the control circuit 210 controls the motor 160 for rotating in the counterclockwise direction so as to revolve the revolution lever 362 and the planet gear 361 in the counterclockwise direction. Thus, the planet gear 361 engages with the second input gear 351 of the second gear train 350. The control circuit 210 further controls the motor 160 for rotating in the counterclockwise direction so as to move the switching mechanism 300 in the state shown in FIG. 16. The following motion of the film rewinding motion is the same as the above-mentioned case from the W standby state.

The motion of the camera 100 in the film rewinding motion observed from the outside of the camera is described. When the film winding motion is stopped in the middle, the lens unit 101 is stopped at a position where the lens unit 101 is pulled a seventeenth length into the camera 100 from the W standby position. When the film rewinding motion starts, the lens unit 101 is further pulled an eighteenth length from the position when the film winding motion is stopped into the camera 100. After that, the lens unit 101 is pushed out the sixth length from the camera 100. During these motions, the driving noise of the film rewinding mechanism 130 can be heard. When the film rewinding motion is completed, the lens unit 101 is further pushed out the seventh length from the camera 100. As a result, the lens unit 101 stops at the W standby state. These motions can be applied not only when the focal length of the optical lens system of the lens unit 101 is set as the shortest focal length W, but also when the focal length is set to one of the middle focal lengths M1 to M3 and the longest focal length T. Hereupon, (seventeenth length)+(eighteenth length)=(sixth length)+(seventh length).

Film Rewinding Motion When the Main Switch is Off

Film rewinding motion when the film rewind switch 121 is turned on under the state that the main switch S0 has been off is described. Since the main switch S0 has been turned off, the switching mechanism 300 is stopped in the collapsed state shown in FIG. 5. When the film rewind switch 121 is turned on, the control circuit 210 controls the motor 160 for rotating in the clockwise direction so as to move the switching mechanism 300 in the state shown in FIG. 6. The control circuit 210 starts to count the number of times of variation of the output signal from the encoder 170 when it receives the detection signal of the edge 401-2 from the electric sensor. When the counted number reaches to a predetermined number corresponding to a moving quantity of the contact member from the edge 401-2 to a middle position of the second section R2, the control circuit 210 controls the motor 160 to stop the rotation thereof.

In the state shown in FIG. 6, the stopper portion 372 of the stopper lever 370 intrudes into the trail of the revolution lever 362. The control circuit 210 further controls the motor 160 for rotating in the counterclockwise direction so as to revolve the revolution lever 362 and the planet gear 361 in the counterclockwise direction. As a result, the revolution lever 362 contacts the stopper lever 370 as shown in FIG. 18.

Under the state that the revolution lever 362 contacts the stopper lever 370, the planet gear 361 engages with the rewinding gear 331. By further rotating the motor 160 in the counterclockwise direction, the driving force of the motor 160 can be transmitted to the rewinding gear 331. The output shaft 330 on which the rewinding gear 331 is secured engages with the film rewinding mechanism 130, so that the exposed film 201 can be rewinded into the film cartridge 200 by the film rewinding mechanism 130.

When the rewinding of the film is completed, the control circuit 210 controls the motor 160 for rotating in the clockwise direction so as to engage the planet gear 361 with the first input gear 341 of the first gear train 340. The switching mechanism 300 is returned to the W standby state shown in FIG. 7. The control circuit 210 starts to count the number of times of variation of the output signal from the encoder 170 when it receives the detection signal of the edge 401-2 from the electric sensor. When the counted number reaches to a predetermined number corresponding to a moving quantity of the contact member from the middle position of the second section R2 to the position the position P11, the control circuit 210 controls the motor 160 to stop the rotation thereof. Subsequently, the control circuit 210 controls the motor 160 for rotating in the counterclockwise direction so as to return the switching mechanism 300 in the collapsed state shown in FIG. 5. The control circuit 210 starts to count the number of times of variation of the output signal from the encoder 170 when it receives the detection signal of the edge 401-1 from the electric sensor. When the counted number reaches to a predetermined number corresponding to a moving quantity of the contact member from the edge 401-1 to the position P0, the control circuit 210 controls the motor 160 to stop the rotation thereof.

The motion of the camera 100 in the film rewinding motion observed from the outside of the camera is described. When the film rewind switch 121 is turned on, the lens unit 101 is pushed out an eighth length from the camera 100. During this motion, the driving noise of the film rewinding mechanism 130 can be heard. When the film rewinding motion is completed, the lens unit 101 is further pushed out a few of ninth length from the camera 100. After that, the lens unit 101 is pulled a tenth length into the camera 100. As a result, the lens unit 101 stops at the collapsed position. Hereupon, (eighth length)+(ninth length)=(tenth length).

Film Loading Motion When the Main Switch is Off

Film loading motion when the film cartridge is mounted under the state that the main switch S0 has been off is described. Since the main switch S0 is turned off, the switching mechanism 300 is stopped in the collapsed state shown in FIG. 5. When the film cartridge 200 is mounted in the camera 100 and the lid 112 is closed, the control circuit 210 controls the motor 160 for rotating in the clockwise direction so as to move the switching mechanism 300 to a state similar to the W standby state shown in FIG. 7. The control circuit 210 controls the motor 160 to stop the rotation thereof when it receives the detection signal of the edge 402-1 from the electric sensor.

Subsequently, the control circuit 210 controls the motor 160 for rotating in the counterclockwise direction so as to engage the planet gear 361 with the second input gear 351 of the second gear train 350 as shown in FIG. 13. The control circuit 210 further controls the motor 160 so as to rotate the cam disc 400 in the counterclockwise direction and to stop in the state shown in FIG. 14. The control circuit 210 starts to count the number of times of variation of the output signal from the encoder 170 when it receives the detection signal of the edge 402-1 from the electric sensor. When the counted number reaches to a predetermined number corresponding to a moving quantity of the contact member from the edge 402-1 to a middle position of the second section R2, the control circuit 210 controls the motor 160 to stop the rotation thereof.

Subsequently, the control circuit 210 controls the motor 160 for rotating in the clockwise direction so as to contact the revolution lever 362 with the stopper lever 370 and to engage the planet gear 361 with the winding gear 321. As a result, the film winding mechanism 120 is driven by the driving force of the motor 160, and the film 201 can be loaded on the camera 100. When the film loading is completed, the control circuit 210 controls the motor 160 for rotating in the counterclockwise direction so as to return the switching mechanism 300 in the collapsed state shown in FIG. 5 through the state shown in FIG. 14. The control circuit 210 starts to count the number of times of variation of the output signal from the encoder 170 when it receives the detection signal of the edge 401-1 from the electric sensor. When the counted number reaches to a predetermined number corresponding to a moving quantity of the contact member from the edge 401-1 to the position P0, the control circuit 210 controls the motor 160 to stop the rotation thereof.

The motion of the camera 100 in the film loading motion observed from the outside of the camera is described. When the lid 112 is closed, the lens unit 101 is pushed out an eleventh length to a position in the vicinity of the wide view end from the camera 100. After that, the lens unit 101 is pulled a twelfth length into the camera 100. During these motions, the driving noise of the film winding mechanism 120 can be heard. When the film loading motion is completed, the lens unit 101 is pulled a thirteenth length into the camera 100. As a result, the lens unit 101 stops at the collapsed position. Hereupon, (eleventh length)=(twelfth length)+(thirteenth length).

Film Loading Motion When the Main Switch is On

Film loading motion when the film cartridge is mounted under the state that the main switch S0 has been on is described. Since the main switch S0 has been turned on, the switching mechanism 300 is stopped in the standby state shown, for example, in FIG. 7. When the film cartridge 200 is mounted in the camera 100 and the lid 112 is closed, the control circuit 210 controls the motor 160 for rotating in the counterclockwise direction so as to engage the planet gear 361 with the second input gear 351 of the second gear train 350 shown in FIG. 13. Furthermore, the control circuit 210 further controls the motor 160 for rotating in the counterclockwise direction so as to rotate the cam disc 400 to the state shown in FIG. 14 in the counterclockwise direction. The control circuit 210 controls the motor 160 to stop the rotation thereof when it counts a predetermined number of times of variation of the output signal from the encoder 170 from the W standby position. Since the most protruded portion 411 on the side wall of the cam disc 400 has a sufficient width, the cam disc 400 can precisely be stopped at the predetermined position.

Subsequently, the control circuit 210 controls the motor 160 for rotating in the clockwise direction so as to contact the revolution lever 362 with the contact lever 370 and to engage the planet gear 361 with the winding gear 321 as shown in FIG. 15. Thus, the film winding mechanism 120 is driven by the driving force of the motor 160 and the film 201 is loaded on the camera 100.

When the film loading is completed, the control circuit 210 controls the motor 160 for rotating in the counterclockwise direction so as to move the switching mechanism 300 in the state shown in FIG. 16 through the state shown in FIG. 14. The control circuit 210 controls the motor 160 to stop the rotation thereof when it receives the detection signal of the edge 401-2 from the electric sensor. Subsequently, the control circuit 210 controls the motor 160 for rotating in the clockwise direction so as to return the switching mechanism 300 in the W standby state shown in FIG. 7 through the state shown in FIG. 17. The control circuit 210 controls the motor 160 to stop the rotation thereof when the control circuit 210 counts a predetermined number of times of variation of the output signal from the encoder 170 corresponding to a moving quantity of the contact member from the edge 401-2 to the point P11 after receiving the detection signal of the edge 401-2 from the electric sensor.

The motion of the camera 100 in the film loading motion observed from the outside of the camera is described. When the lid 112 is closed, the lens unit 101 is pulled a fourteenth length into the camera 100 from the W standby position. During this motion, the driving noise of the film winding mechanism 120 can be heard. When the film loading motion is completed, the lens unit 101 is pulled a fifteenth length and pushed out a sixteenth length. As a result, the lens unit 101 stops at the W standby position. These motions can be applied not only when the focal length of the optical lens system of the lens unit 101 is set as the shortest focal length W, but also when the focal length is set to one of the middle focal lengths M1 to M3 and the longest focal length T. Hereupon, (fourteenth length)+(fifteenth length)=(sixteenth length).

As mentioned above, the zooming mechanism 150 controls the focal length of the optical lens system of the lens unit 101. The film winding mechanism 120 pulls out the film 201 by the length corresponding to one frame from the film cartridge 200 and winding around the spool 111 of the camera 100 when the frame is exposed. The film rewinding mechanism 130 rewinds the film 201 into the film cartridge 200. The switching mechanism 300 selectively transmits the driving force of motor 160 by changing the engagement of the planet gear 361 with one of the winding gear 321, the rewinding gear 331, the first input gear 341 of the first gear train 340 and the second input gear 351 of the second gear train 350. As a result, the camera in accordance with the embodiment of this invention can control the motion of at least the zooming of the optical lens system of the lens unit 101 and the winding and rewinding of the film by only one motor 160 without any actuator such as a plunger. Thus, the driving noise due to the alternation of the sounds of the motor and the plunger may not be heard. The driving noise of the camera can be reduced.

Other Modifications

Another modification of the camera in accordance with the embodiment of this invention is described with reference to FIGS. 19 to 21. The explanations of the elements which are in common with the above-mentioned description are omitted.

Figure 19:
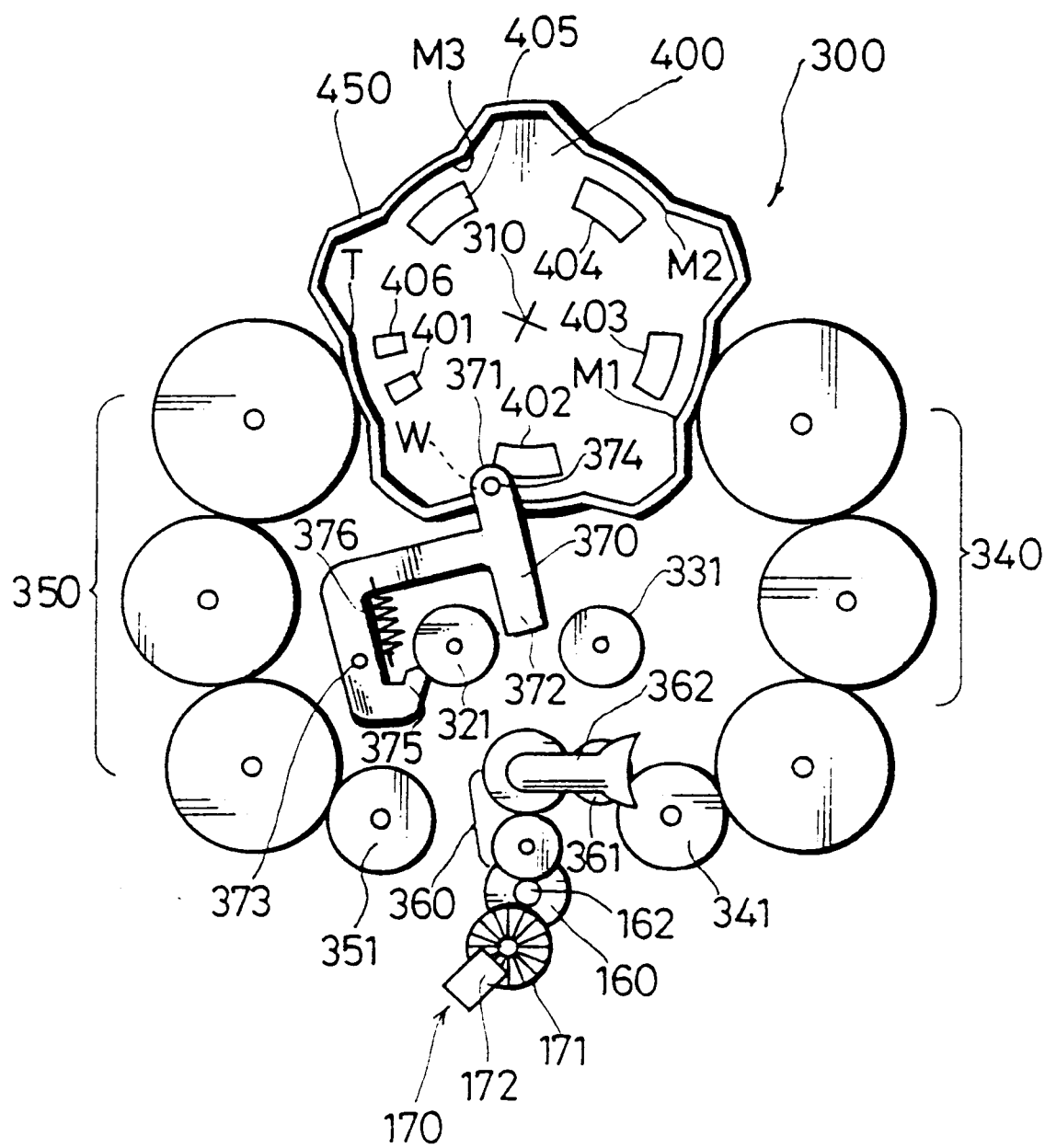
FIG. 19 is a plan view showing the W standby state of a modification of the switching mechanism in the embodiment.

FIG. 19 shows a modification of the switching mechanism 300 in the W standby state. In this modification, a wall 450 having a predetermined height is formed along the outer periphery of the cam disc 400. A pin 374 is provided on the contact portion 371 of the contact lever 370. The contact lever 370 is biased by a spring 376 so as to contact and to slide the pin 374 on an inside face of the wall 450. A second contact portion 375 is formed on an end of the stopper lever 370 which is opposite to the contact portion 371 with respect to a rotation shaft 373. When the stopper portion 372 is shunted from the trail of the revolution lever 362, the second stopper portion 375 contacts the winding gear 321 so as to stop the rotation of the winding gear 321. The stopper lever 370 further serves as a locking mechanism of the film winding mechanism 120 so as not to move the film undesirably, since the winding gear 321 becomes free during the zooming motion by the zooming mechanism 150. When the planet gear 361 revolves between the first input gear 341 of the first gear train 340 and the second input gear 351 of the second gear train 350, the planet gear 361 engages with the winding gear 321. However, the winding gear 321 is locked by the stopper lever 370, so that the film winding mechanism 120 which is connected to the winding gear 321 cannot be moved. As a result, the film may not be moved. On the other hand, when the planet gear 361 engages with the winding gear 321, since the planet gear 361 is rotated in a direction opposite to the revolution direction of the revolution lever 362, the rotation of the planet gear 361 may not be obstructed.

Figure 20:
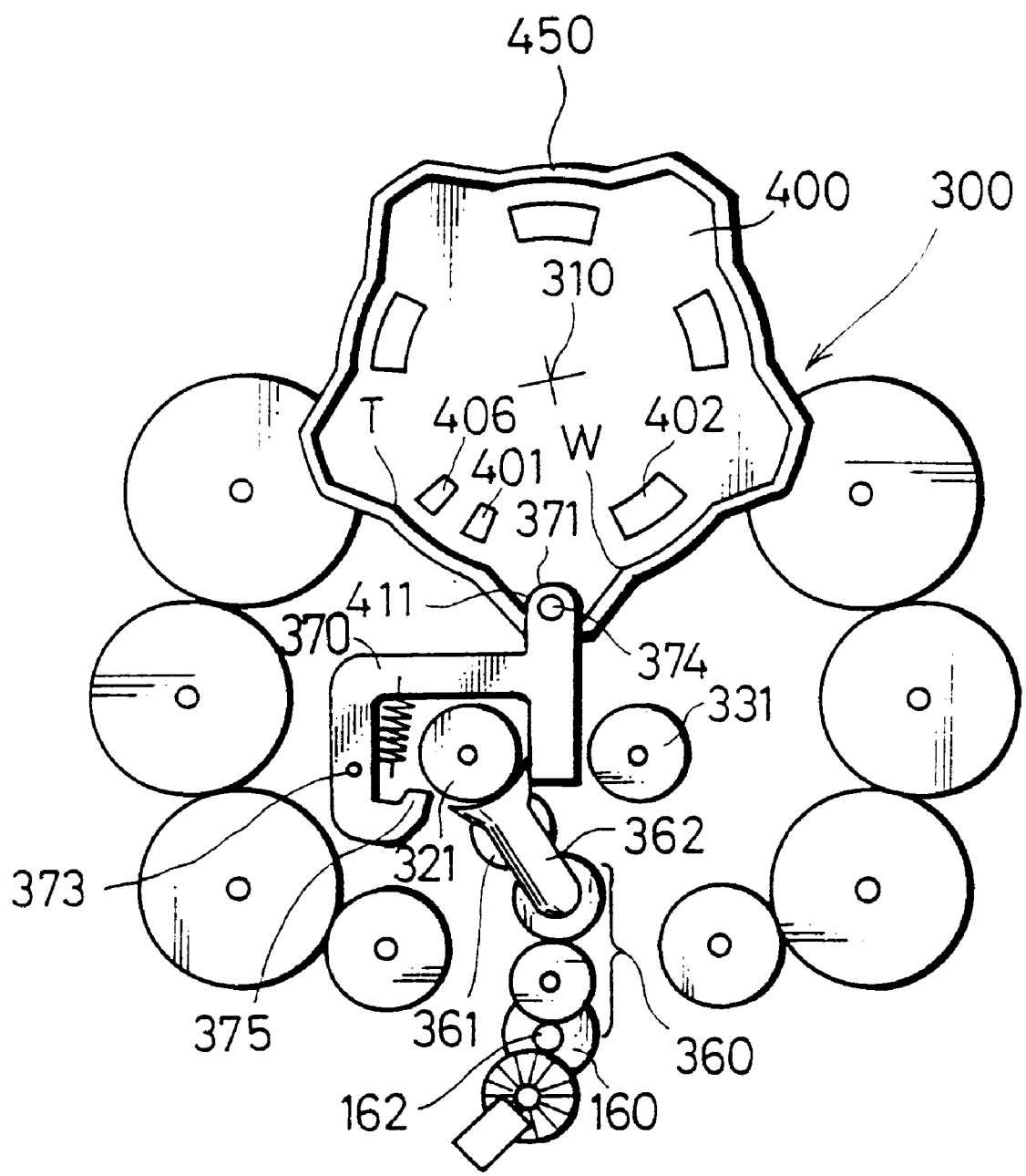
FIG. 20 is a plan view showing a middle state of the modification of the switching mechanism in the winding motion of the film in the embodiment.

FIG. 20 shows a state of the switching mechanism 300 during the film winding motion. The pin 374 provided on the stopper lever 370 contacts a portion of the inside face of the wall 450 corresponding to the most protruded portion 411 of the cam disc 400. The stopper lever 370 is rotated in the clockwise direction around the shaft 373, so that the stopper portion 371 intrudes into the trail of the revolution lever 362. On the other hand, the second stopper portion 375 of the stopper lever 370 does not contact with the winding gear 321, so that the winding gear 321 can freely be rotated. Furthermore, the revolution lever 362 contacts with the stopper portion 372 of the stopper lever 370 so that the planet gear 361 engages with the winding gear 321. When the motor 160 is rotated in the clockwise direction, the driving force of the motor 160 can be transmitted to the film winding mechanism 120 via the winding gear 321. As a result, the film can be wound by the length corresponding to one frame by the film winding mechanism 120.

Figure 21:
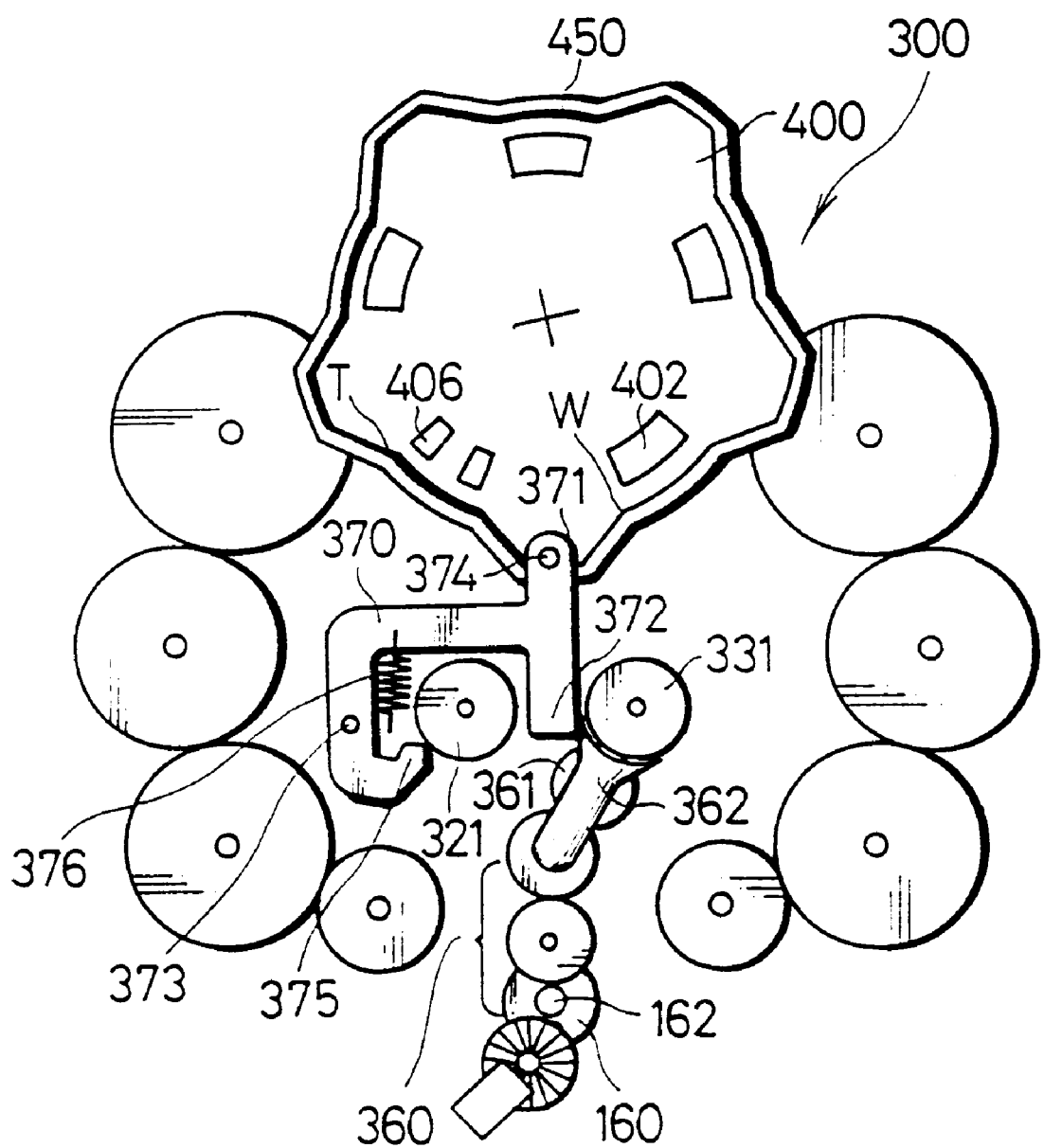
FIG. 21 is a plan view showing a middle state of the modification of the switching mechanism in the rewinding motion of the film in the embodiment.

FIG. 21 shows a state of the switching mechanism 300 during the film rewinding motion. Likewise the film winding motion shown in FIG. 20, the pin 374 provided on the stopper lever 370 contacts a portion of the inside face of the wall 450 corresponding to the most protruded portion 411 of the cam disc 400. The stopper lever 370 is rotated in the clockwise direction around the shaft 373, so that the stopper portion 371 intrudes into the trail of the revolution lever 362. On the other hand, the second stopper portion 375 of the stopper lever 370 does not contact with the winding gear 321, so that the winding gear 321 can freely be rotated. Furthermore, the revolution lever 362 contacts with the stopper portion 372 of the stopper lever 370 so that the planet gear 361 engages with the rewinding gear 331. When the motor 160 rotates in the counterclockwise direction, the driving force of the motor 160 can be transmitted to the film rewinding mechanism 130 via the rewinding gear 331. As a result, the film 201 can be rewinded into the film cartridge 200 by the film rewinding mechanism 130.

In the above-mentioned description, the zooming mechanism 150 is configured to serve as not only the focal length control mechanism but also the focusing mechanism for the optical lens system of the lens unit 101. However, the configuration of the zooming mechanism 150 is not restricted by this embodiment. It is possible that the zooming mechanism 150 controls only the focal length of the optical lens system of the lens unit 101, and the focusing of the optical lens system is controlled by another mechanism with another actuator. In this case, the motor 160 drives the zooming motion of the lens unit 101 and the winding and rewinding motion of the film 201.

Furthermore, in the embodiment, the cam to which the contact portion 371 of the contact lever 370 is formed on the side wall of the rotatable cam disc 400. However, the configuration of the contact lever 370 and the cam is not restricted by this embodiment. It is preferable that at least the contact portion 372 of the contact lever 370 be intruded into and shunted from the trail of the revolution lever 362 pivoting the planet gear 361. Thus, the cam can be formed on a reciprocally moving member. Furthermore, it is possible that the cam is formed on a cam ring of the zoom lens. Alternatively, it is possible that the position data of the zooming mechanism 150 is obtained from the lens barrel moving in the direction parallel to the optical axis of the optical lens system of the lens unit 101, and the stopper lever 370 is moved corresponding to the position data of the zooming mechanism 150 independently from the movement of the zooming mechanism 150.

Furthermore, in the above-mentioned embodiment, the elements constituting the switching mechanism 300 are arranged on the planes. However, the configuration of the switching mechanism 300 is not restricted by this embodiment. It is preferable that at least the planet gear 361 selectively be engaged with one of the winding gear 321, the rewinding gear 331, the first input gear 341 and the second input gear 351. It is possible that at least a part of these gears can be provided in a direction perpendicular to the other by using a bevel gear or the like. Furthermore, in the above-mentioned embodiment, the rotation shaft of the stopper lever 370 and the rotation shaft of the revolution lever 362 are disposed in parallel with each other. However, it is possible that the rotation shaft of the stopper lever 370 can be disposed perpendicular to the rotation shaft of the revolution lever 362.

Furthermore, in the above-mentioned embodiment, when the planet gear 361 revolves between the first input gear 341 of the first gear train 340 and the second input gear 351 of the second gear train 350, the planet gear 361 engages with the winding gear 321 and the rewinding gear 331. Thus, the winding gear 321 and the rewinding gear 331 are rarely rotated a little. If the movement of the film due to the rotation of the winding gear 321 or the rewinding gear 331 cannot be ignored, it is preferable that gear lock mechanisms be provided likewise the modification shown in FIGS. 19 to 21. Alternatively, it is preferable that friction mechanisms be provided in the film winding mechanism 120 and the film rewinding mechanism 130.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A camera comprising: a driving source; a zooming mechanism which includes a moving member for varying a focal length of an optical lens system; a driven mechanism; and a switching mechanism which selectively transmits a driving force of the driving source to one of the zooming mechanism and the driven mechanism corresponding to the position of the moving member.

2. The camera in accordance with claim 1, wherein the driven mechanism is a film feeding mechanism.

3. The camera in accordance with claim 2, wherein the film feeding mechanism winds a film.

4. The camera in accordance with claim 2, wherein the film feeding mechanism rewinds a film.

5. The camera in accordance with claim 1, wherein the driving source generates both of forward and reverse rotational driving forces, and the switching mechanism includes a planet gear which can revolve in both directions corresponding to the driving direction of the driving source and a restriction member which restricts the revolution of the planet gear corresponding to the position of the moving member.

6. The camera in accordance with claim 5, wherein the zooming mechanism is a stepping zooming mechanism which selectively sets the focal length of the optical lens system at one of predetermined focal lengths by moving the moving member, and the restriction member restricts the revolution of the planet gear while the moving member is moving between two positions at which the focal length of the optical lens system is set to be one of the predetermined focal lengths.

7. The camera in accordance with claim 6, wherein the switching mechanism transmits the driving force of the driving source to the driven mechanism while the restriction member has been restricting the revolution of the planet gear.

8. The camera in accordance with claim 1, wherein the zooming mechanism is a stepping zooming mechanism which selectively sets the focal length of the optical lens system at one of predetermined focal lengths by moving the moving member, and the moving member can be moved in a predetermined region while the focal length of the optical lens system is set to be one of the predetermined focal lengths so as to focus the optical lens system.

9. The camera in accordance with claim 8, wherein the switching mechanism transmits the driving force of the driving source to the driven mechanism while the moving member is positioned out of the predetermined region.

10. A driving method comprising the steps that:

a driving force in a first direction is generated by a driving source and it is transmitted to a zooming mechanism via a switching mechanism so as to move a moving member which varies a focal length of an optical lens system;

the driving source is stopped to generate the driving force when the moving member is stopped at a first predetermined position where the switching mechanism can transmit the driving force by the driving source to the driven mechanism;

a driving force in a second direction opposite to the first direction is generated by the driving source and it is transmitted to the driven mechanism via the switching mechanism;

a driving force in the first direction is generated by the driving source and it is transmitted to the zooming mechanism via the switching mechanism so as to move the moving member which varies the focal length of the optical lens system; and the driving source is stopped to generate the driving force when the moving member is stopped at a second predetermined position where the switching mechanism cannot transmit the driving force by the driving source to the driven mechanism.

11. The driving method in accordance with claim 10 further comprising the step that a driving force in the second direction is generated by the driving source when the moving member is stopped at the second predetermined position and it is transmitted to the zooming mechanism via the switching mechanism so as to move the moving member which varies the focal length of the optical lens system.

12. A camera comprising: a zooming mechanism which varies a focal length of an optical lens system; a film winding mechanism for pulling out a film from a film cartridge and moves the film in a film winding direction by a predetermined length corresponding to one frame; a film rewinding mechanism which moves the film in a film rewinding direction; a single driving source; and a switching mechanism which selectively transmits a driving force of the driving source to one of the zooming mechanism, the film winding mechanism and the film rewinding mechanism by engaging the driving source to one of them, wherein said switching mechanism selectively transmits the driving force to one of the zooming mechanism, the film winding mechanism and the film rewinding mechanism as a result of a force only from said driving source.

13. The camera in accordance with claim 12, wherein the optical lens system is a stepping zoom lens which varies the focal length at one of predetermined focal lengths, and the zooming mechanism focuses the optical lens system with respect to each predetermined focal length.

14. The camera in accordance with claim 12, wherein the switching mechanism includes a planet gear which can revolve in both directions by the driving force of the driving source and a restriction member which can be intruded into and shunted from a trail of the planet gear so as to restrict the revolution of the planet gear.

15. The camera in accordance with claim 14, wherein the switching mechanism contacts the restriction member and a contact face of the switching mechanism with the restriction member is formed so as to control the intruding motion and shunting motion of the restriction member corresponding to the position of the zooming mechanism.

16. A camera comprising: a driving source; a moving mechanism which includes a moving member for moving an optical lens system; a driven mechanism; and a switching mechanism which selectively transmits a driving force of the driving source to one of the moving mechanism and the driven mechanism corresponding to the position of said moving member.

* * * * *